US012681570B2

(12) United States Patent
Wang

(10) Patent No.: US 12,681,570 B2
(45) Date of Patent: Jul. 14, 2026

(54) METHOD AND APPARATUS FOR MOVING VIRTUAL OBJECT, ELECTRONIC DEVICE, AND STORAGE MEDIUM

(71) Applicant: Beijing Zitiao Network Technology Co., Ltd., Beijing (CN)

(72) Inventor: Xiaoyang Wang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/988,720

(22) Filed: Dec. 19, 2024

(65) Prior Publication Data

US 2025/0306675 A1 Oct. 2, 2025

(30) Foreign Application Priority Data

Mar. 29, 2024 (CN) .......................... 202410382038.3
Mar. 29, 2024 (CN) .......................... 202410382052.3

(51) Int. Cl.
| | |
|---|---|
| *G06F 3/01* | (2006.01) |
| *G06F 3/038* | (2013.01) |
| *G06T 19/20* | (2011.01) |

(52) U.S. Cl.
CPC ............. *G06F 3/013* (2013.01); *G06F 3/038* (2013.01); *G06T 19/20* (2013.01); *G06F 2203/0381* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 9,327,192 B2 * | 5/2016 | Nonaka | ................. | A63F 13/211 |
| 9,901,814 B2 * | 2/2018 | Nonaka | .................. | A63F 13/24 |
| 10,607,417 B2 * | 3/2020 | Sasaki | .................. | H04N 13/111 |

(Continued)

FOREIGN PATENT DOCUMENTS

CN          115591234 A          1/2023

OTHER PUBLICATIONS

European Search Report for EP Patent Application No. 24221941.8, Issued on Jan. 27, 2025, 6 pages.

(Continued)

*Primary Examiner* — Fred Tzeng

(57) ABSTRACT

A method and apparatus for moving a virtual object, an electronic device, and a storage medium are provided. The method includes: displaying a computer-generated three-dimensional environment; detecting position data of an interactor and determining a first movement vector of the interactor in a world rectangular coordinate system; determining, based on the first movement vector, a second movement vector of the interactor in a local rectangular coordinate system with a user's own position as an origin; determining, based on the second movement vector, a third movement vector of the interactor in a local spherical coordinate system with the user's own position as an origin; determining, based on the third movement vector, a fourth movement vector of a target virtual object in the local spherical coordinate system; and obtaining second coordinates of the target virtual object based on first coordinates of the target virtual object and the fourth movement vector.

20 Claims, 9 Drawing Sheets

(56)     References Cited

U.S. PATENT DOCUMENTS

| | | | |
|---|---|---|---|
| 10,719,991 B2 * | 7/2020 | Sasaki | H04N 13/117 |
| 10,721,456 B2 * | 7/2020 | Sasaki | H04N 13/221 |
| 10,999,567 B2 * | 5/2021 | Sasaki | H04N 13/117 |
| 11,161,041 B2 * | 11/2021 | Deng | A63F 13/537 |
| 11,893,153 B2 | 2/2024 | Hashimoto et al. | |
| 12,135,859 B2 * | 11/2024 | Lee | G06F 17/16 |
| 2006/0281546 A1 * | 12/2006 | Iwamoto | G06T 19/003 |
| | | | 463/32 |
| 2008/0318677 A1 * | 12/2008 | Ohta | A63F 13/428 |
| | | | 463/36 |
| 2015/0002512 A1 * | 1/2015 | Iwamoto | A63F 13/837 |
| | | | 345/427 |
| 2017/0136359 A1 * | 5/2017 | Iwamoto | A63F 13/57 |
| 2018/0122043 A1 | 5/2018 | Energin et al. | |
| 2018/0150132 A1 | 5/2018 | Xiao et al. | |
| 2020/0162716 A1 * | 5/2020 | Sasaki | H04N 13/366 |
| 2021/0012113 A1 * | 1/2021 | Petill | G06F 1/1694 |
| 2021/0166484 A1 | 6/2021 | Kim et al. | |
| 2021/0279467 A1 * | 9/2021 | Petill | G06F 3/012 |
| 2023/0100610 A1 | 3/2023 | Pastrana Vicente et al. | |

OTHER PUBLICATIONS

Office action received from Chinese patent application No. 202410382038.3 mailed on Jun. 12, 2026, 5 pages.

* cited by examiner

Figure 3:
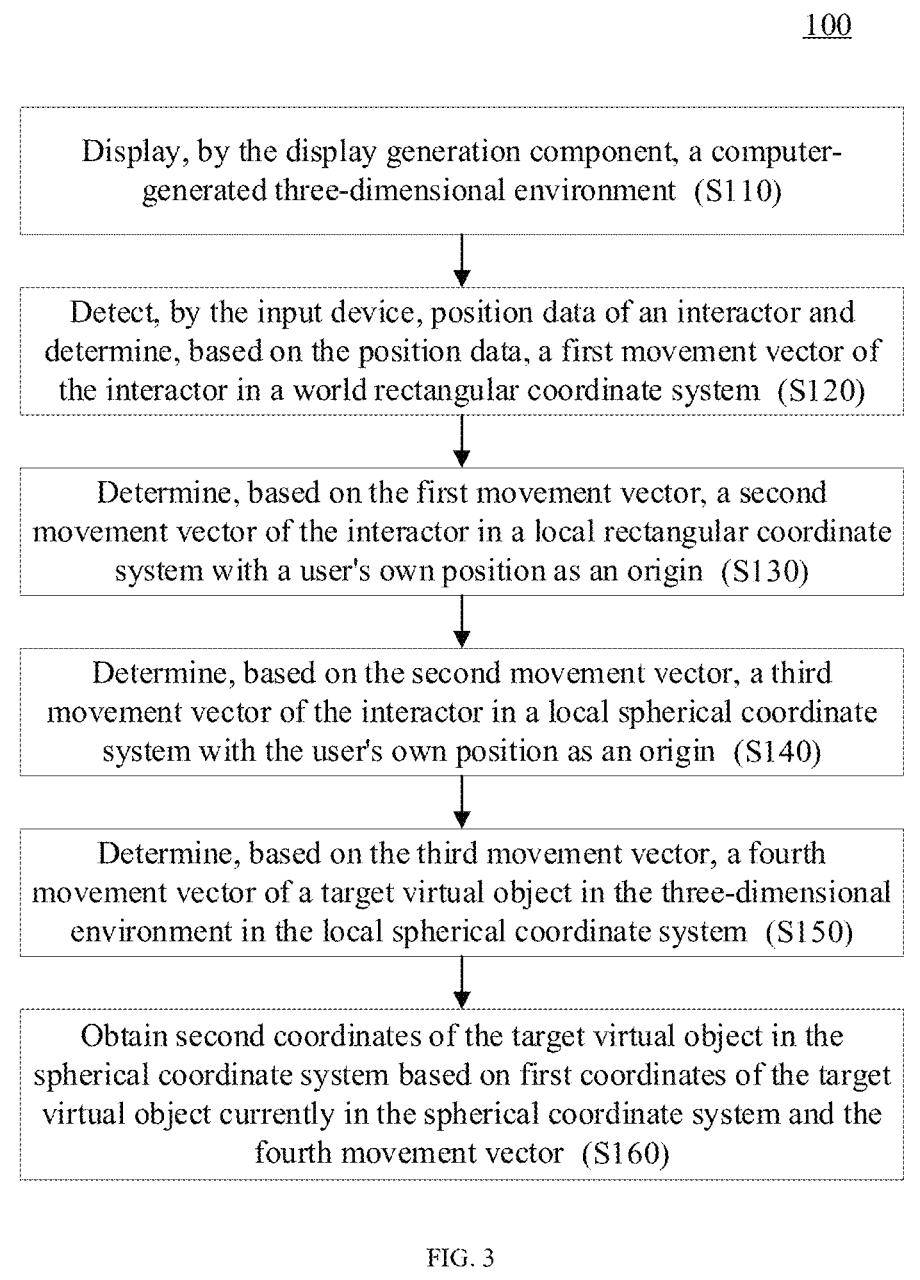

100

Display, by the display generation component, a computer-generated three-dimensional environment (S110)

↓

Detect, by the input device, position data of an interactor and determine, based on the position data, a first movement vector of the interactor in a world rectangular coordinate system (S120)

↓

Determine, based on the first movement vector, a second movement vector of the interactor in a local rectangular coordinate system with a user's own position as an origin (S130)

↓

Determine, based on the second movement vector, a third movement vector of the interactor in a local spherical coordinate system with the user's own position as an origin (S140)

↓

Determine, based on the third movement vector, a fourth movement vector of a target virtual object in the three-dimensional environment in the local spherical coordinate system (S150)

↓

Obtain second coordinates of the target virtual object in the spherical coordinate system based on first coordinates of the target virtual object currently in the spherical coordinate system and the fourth movement vector (S160)

Figure 9:
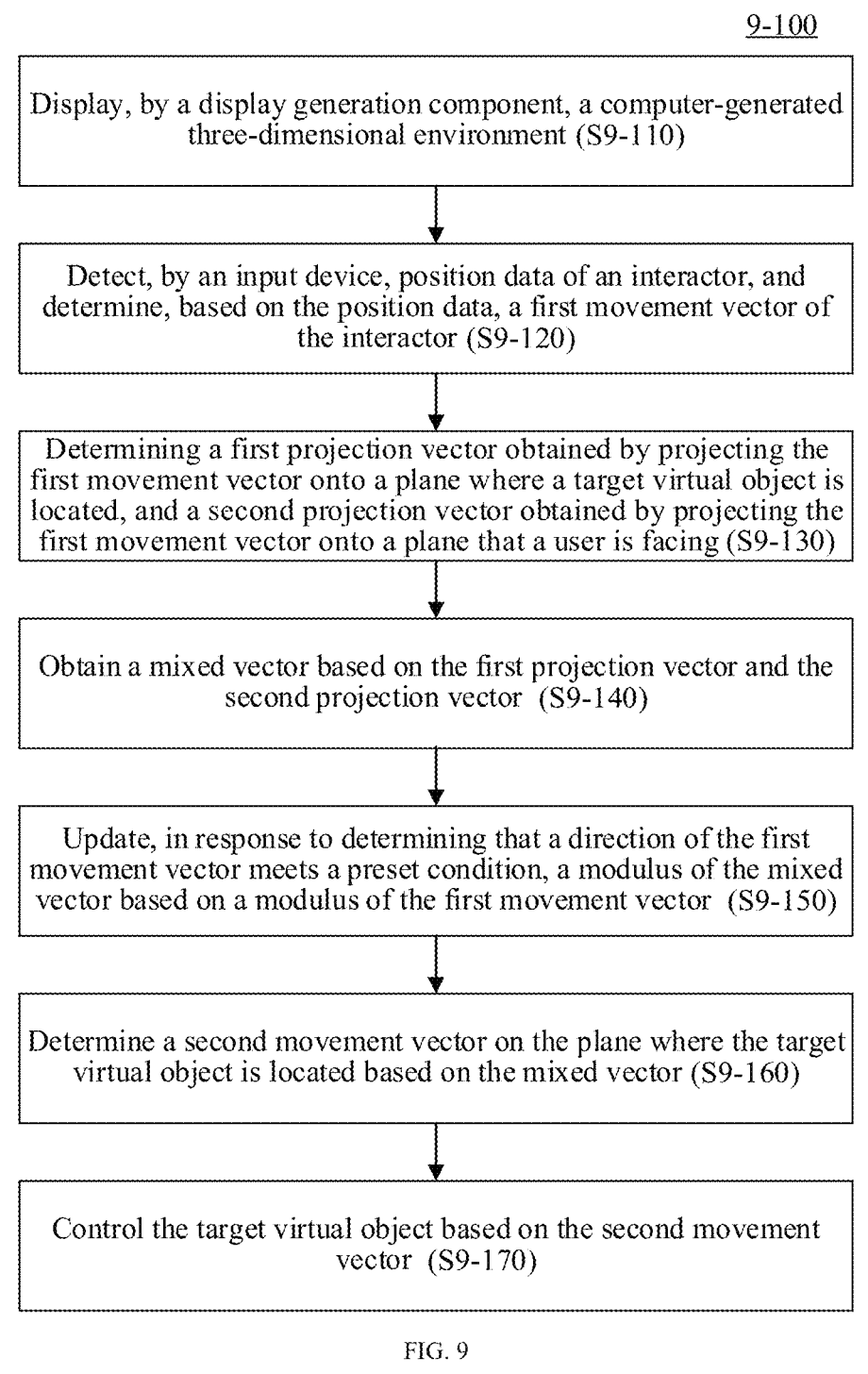

Display, by a display generation component, a computer-generated three-dimensional environment (S9-110)

Detect, by an input device, position data of an interactor, and determine, based on the position data, a first movement vector of the interactor (S9-120)

Determining a first projection vector obtained by projecting the first movement vector onto a plane where a target virtual object is located, and a second projection vector obtained by projecting the first movement vector onto a plane that a user is facing (S9-130)

Obtain a mixed vector based on the first projection vector and the second projection vector (S9-140)

Update, in response to determining that a direction of the first movement vector meets a preset condition, a modulus of the mixed vector based on a modulus of the first movement vector (S9-150)

Determine a second movement vector on the plane where the target virtual object is located based on the mixed vector (S9-160)

Control the target virtual object based on the second movement vector (S9-170)

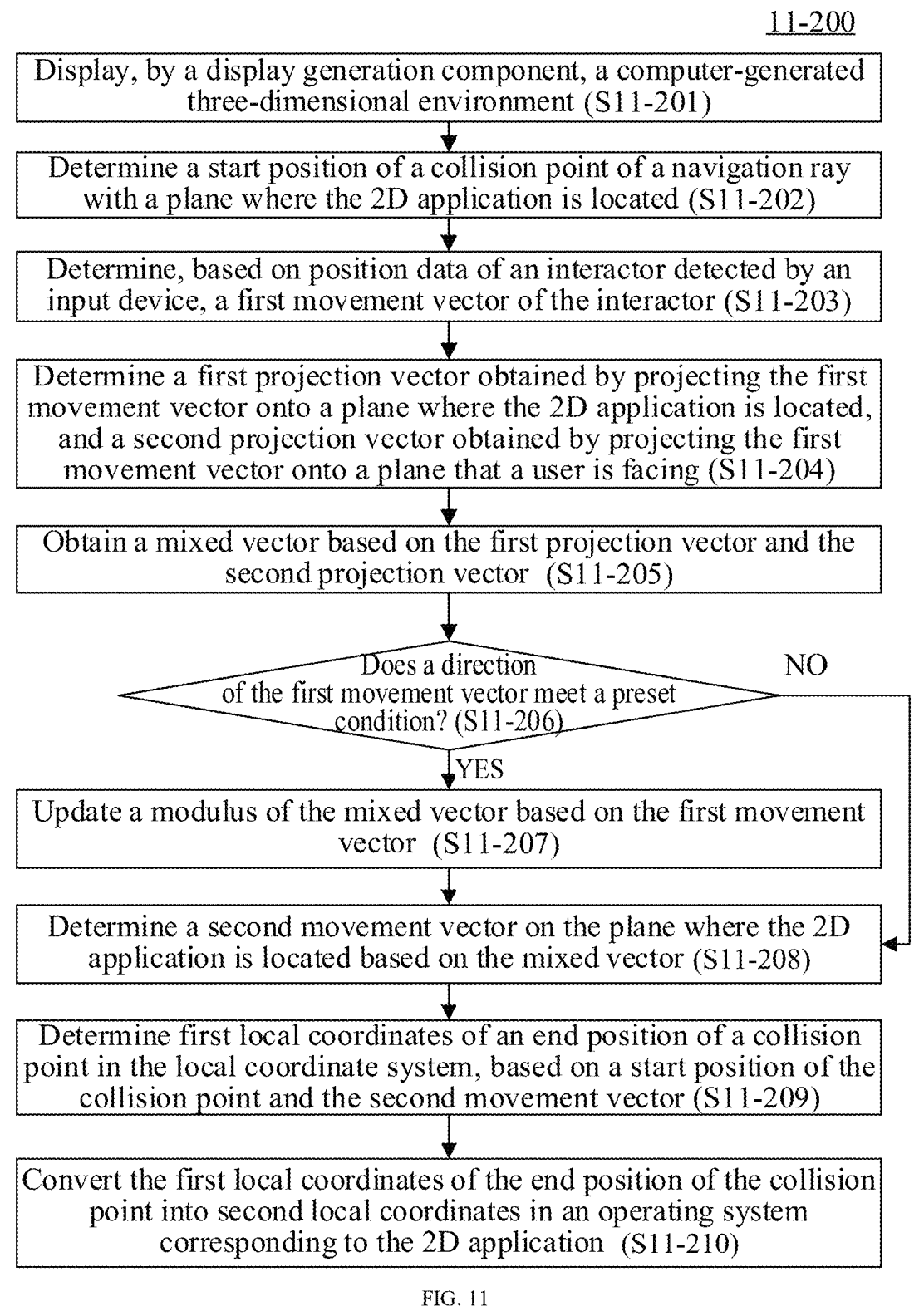

Display, by a display generation component, a computer-generated three-dimensional environment (S11-201)

↓

Determine a start position of a collision point of a navigation ray with a plane where the 2D application is located (S11-202)

↓

Determine, based on position data of an interactor detected by an input device, a first movement vector of the interactor (S11-203)

↓

Determine a first projection vector obtained by projecting the first movement vector onto a plane where the 2D application is located, and a second projection vector obtained by projecting the first movement vector onto a plane that a user is facing (S11-204)

↓

Obtain a mixed vector based on the first projection vector and the second projection vector (S11-205)

↓

Does a direction of the first movement vector meet a preset condition? (S11-206)    NO

↓YES

Update a modulus of the mixed vector based on the first movement vector (S11-207)

↓

Determine a second movement vector on the plane where the 2D application is located based on the mixed vector (S11-208)

↓

Determine first local coordinates of an end position of a collision point in the local coordinate system, based on a start position of the collision point and the second movement vector (S11-209)

↓

Convert the first local coordinates of the end position of the collision point into second local coordinates in an operating system corresponding to the 2D application (S11-210)

FIG. 11

METHOD AND APPARATUS FOR MOVING VIRTUAL OBJECT, ELECTRONIC DEVICE, AND STORAGE MEDIUM

CROSS-REFERENCE TO RELATED APPLICATION(S)

This application claims priorities to Chinese Application No. 202410382052.3 filed on Mar. 29, 2024 and Chinese Application No. 202410382038.3 filed on Mar. 29, 2024, the disclosures of which are incorporated herein by reference in their entireties.

FIELD

The present disclosure relates to a field of computer technologies, and in particular to a method and apparatus for moving a virtual object, an electronic device, and a storage medium.

BACKGROUND

Extended reality (XR) technology can combine reality with virtuality through a computer to provide a user with a three-dimensional environment that allows for human-machine interaction. In related extended reality solutions, there are two ways to drag virtual objects (e.g., 3D objects) in the three-dimensional environment: (1) Direct dragging: The user contacts and drags a virtual object directly by means of a ray or a hand (controller). In this case, a position of the virtual object after dragging can be obtained directly from a current position of the ray or from the position of the hand (controller). For example, when dragging in a controller mode, if the virtual object is selected, a position to which a point on the ray that collides with the object is moved is the position of the virtual object during dragging. (2) Indirect dragging: Indirect dragging is also referred to as incremental dragging. When the user drags the virtual object in an "eye+hand (or controller)" mode, the hand (or controller) does not make contact with the virtual object directly. Therefore, a position of an interactive object during dragging may be obtained in this way, that is, displacement of a hand (or controller) in world space is appropriately converted into displacement of the virtual object in world space, and then the position of the virtual object after dragging may be obtained finally based on a position of the virtual object in world space before dragging.

For direct dragging, it aligns well with cognitive understanding of the user, and is relatively simple to implement. That is, the positions of an interactor and the dragged virtual object are in a one-to-one correspondence in world space. For indirect dragging, a simple correspondence between the displacement of the interactor and the displacement of the virtual object does not align with the perception of the user in an extended reality environment (especially in mixed reality), thereby easily reducing the operation efficiency of the user.

SUMMARY

The Summary is provided to give a brief overview of concepts, which will be described in detail later in the Detailed Description section. The Summary is neither intended to identify key or necessary features of the claimed technical solutions, nor is it intended to be used to limit the scope of the claimed technical solutions.

In a first aspect, according to one or more embodiments of the present disclosure, there is provided a method for moving a virtual object. The method includes:

performing following steps at an electronic device in communication with a display generation component and an input device:

displaying, by the display generation component, a computer-generated three-dimensional environment;

detecting, by the input device, position data of an interactor and determining, by the input device and based on the position data, a first movement vector of the interactor in a world rectangular coordinate system;

determining, based on the first movement vector, a second movement vector of the interactor in a local rectangular coordinate system with a user's own position as an origin;

determining, based on the second movement vector, a third movement vector of the interactor in a local spherical coordinate system with the user's own position as an origin;

determining, based on the third movement vector, a fourth movement vector of a target virtual object in the three-dimensional environment in the local spherical coordinate system; and obtaining second coordinates of the target virtual object in the local spherical coordinate system based on first coordinates of the target virtual object currently in the local spherical coordinate system and the fourth movement vector.

In a second aspect, according to one or more embodiments of the present disclosure, there is provided an apparatus for moving a virtual object. The apparatus includes:

a display unit configured to display a computer-generated three-dimensional environment;

a first vector determination unit configured to determine, based on position data of an interactor detected by an input device, a first movement vector of the interactor in a world rectangular coordinate system;

a second vector determination unit configured to determine, based on the first movement vector, a second movement vector of the interactor in a local rectangular coordinate system with a user's own position as an origin;

a third vector determination unit configured to determine, based on the second movement vector, a third movement vector of the interactor in a local spherical coordinate system with the user's own position as an origin;

a fourth vector determination unit configured to determine, based on the third movement vector, a fourth movement vector of a target virtual object in the three-dimensional environment in the local spherical coordinate system; and a coordinates determination unit configured to obtain second coordinates of the target virtual object in the local spherical coordinate system based on first coordinates of the target virtual object currently in the local spherical coordinate system and the fourth movement vector.

In a third aspect, according to one or more embodiments of the present disclosure, there is provided an electronic device. The electronic device includes: at least one memory and at least one processor, where the memory is configured to store program code, and the processor is configured to call the program code stored in the memory, to cause the electronic device to perform the method for moving a virtual object according to one or more embodiments of the present disclosure.

In a fourth aspect, according to one or more embodiments of the present disclosure, there is provided a non-transitory computer storage medium storing program code that is executable by a computer device to cause the computer device to perform the method for moving a virtual object according to one or more embodiments of the present disclosure.

According to one or more embodiments of the present disclosure, the first movement vector of the interactor in the world rectangular coordinate system is converted into the second movement vector of the interactor in the user local rectangular coordinate system, and the second movement vector is converted into the third movement vector of the interactor in the user local spherical coordinate system, and based on this, the movement vector of the target virtual object and the coordinates thereof after movement in the user local spherical coordinate system are determined, so that when the user moves the virtual object in the three-dimensional environment, the moved object can be rotated around the user as a center, rather than simply translating right and left or up and down. Hence, it is more consistent with the self-centric perception of the user in the extended reality environment, allowing for increased efficiency of interaction of the user in the extended reality space. In addition, when the user faces the virtual object in different directions, the moving space of the virtual object rotates with the orientation of the user, so that the user's experience of manipulating the virtual object is consistent.

In a fifth aspect, according to one or more embodiments of the present disclosure, there is provided a method for controlling a virtual object. The method includes:

performing the following steps at an electronic device in communication with a display generation component and an input device:

displaying, by the display generation component, a computer-generated three-dimensional environment;

detecting, by the input device, position data of an interactor and determining, by the input device and based on the position data, a first movement vector of the interactor;

determining a first projection vector obtained by projecting the first movement vector onto a plane where a target virtual object is located, and a second projection vector obtained by projecting the first movement vector onto a plane that a user is facing;

obtaining a mixed vector based on the first projection vector and the second projection vector, where in response to an included angle between the first movement vector and the plane where the target virtual object is located being smaller relative to an included angle between the first movement vector and the plane that the user is facing, a weight of the first projection vector is greater relative to that of the second projection vector;

updating, in response to determining that a direction of the first movement vector meets a preset condition, a modulus of the mixed vector based on a modulus of the first movement vector, where an updated modulus of the mixed vector is approximately equal to the modulus of the first movement vector;

determining a second movement vector on the plane where the target virtual object is located based on the mixed vector; and controlling the target virtual object based on the second movement vector.

In a sixth aspect, according to one or more embodiments of the present disclosure, there is provided an apparatus for controlling a virtual object. The apparatus includes:

a display unit configured to display a computer-generated three-dimensional environment;

a first movement vector determination unit configured to detect, by an input device, position data of an interactor and determine, by the input device and based on the position data, a first movement vector of the interactor;

a projection vector determination unit configured to determine a first projection vector obtained by projecting the first movement vector onto a plane where a target virtual object is located, and a second projection vector obtained by projecting the first movement vector onto a plane that a user is facing;

a mixed vector determination unit configured to obtain a mixed vector based on the first projection vector and second projection vector, where in response to an included angle between the first movement vector and the plane where the target virtual object is located being smaller relative to an included angle between the first movement vector and the plane that the user is facing, a weight of the first projection vector is greater relative to that of the second projection vector;

a modulus updating unit configured to update, in response to determining that a direction of the first movement vector meets a preset condition, a modulus of the mixed vector based on a modulus of the first movement vector, where an updated modulus of the mixed vector is approximately equal to the modulus of the first movement vector;

a second vector determination unit configured to determine a second movement vector on the plane where the target virtual object is located based on the mixed vector; and an object control unit configured to control the target virtual object based on the second movement vector.

In a seventh aspect, according to one or more embodiments of the present disclosure, there is provided an electronic device. The electronic device includes: at least one memory and at least one processor, where the memory is configured to store program code, and the processor is configured to call the program code stored in the memory, to cause the electronic device to perform the method for controlling a virtual object according to one or more embodiments of the present disclosure.

In an eighth aspect, according to one or more embodiments of the present disclosure, there is provided a non-transitory computer storage medium storing program code that is executable by a computer device to cause the computer device to perform the method for controlling a virtual object according to one or more embodiments of the present disclosure.

According to one or more embodiments of the present disclosure, the mixed vector is obtained based on the first projection vector obtained by projecting the first movement vector of the interactor onto the plane where the target virtual object is located and the second projection vector obtained by projecting the first movement vector onto the plane that the user is facing, where if the included angle between the first movement vector and the plane where the target virtual object is located is smaller relative to the included angle between the first movement vector and the plane that the user is facing, the weight of the first projection vector is greater relative to that of the second projection vector; in response to determining that the direction of the first movement vector meets the preset condition, the modulus of the mixed vector is updated based on the modulus of the first movement vector, where the updated modulus of the mixed vector is approximately equal to the modulus of the first movement vector; and the mixed vector is further used to determine the second movement vector on the plane where the target virtual object is located for use in controlling the target virtual object, so that it is possible to improve the situation where in some cases manipulation is gradually difficult as the included angle between the direction of movement of the interactor and the plane of the virtual object becomes larger, and to make the control of the target virtual object by the user more consistent with the perception of the user.

BRIEF DESCRIPTION OF THE DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

FIG. 3 is a schematic flowchart of a method for moving a virtual object according to an embodiment of the present disclosure;

FIG. 9 is a schematic flowchart of a method for controlling a virtual object according to an embodiment of the present disclosure;

FIG. 11 is a schematic flowchart of a method for controlling a virtual object according to another embodiment of the present disclosure;

DETAILED DESCRIPTION OF EMBODIMENTS

Figure 1:
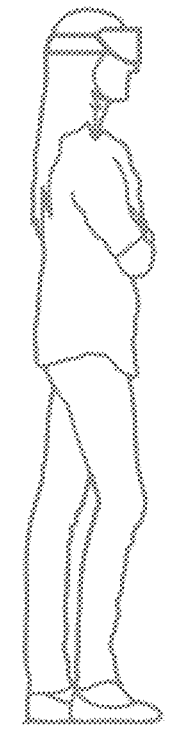
FIG. 1 is a schematic diagram of an extended reality device according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the steps described in implementations of the present disclosure may be performed in different orders, and/or performed in parallel. Furthermore, additional steps may be included and/or the execution of the illustrated steps may be omitted in the implementations. The scope of the present disclosure is not limited in this respect.

The term "include" used herein and the variations thereof are an open-ended inclusion, namely, "include but not limited to". The term "based on" is "at least partially based on". The term "an embodiment" means "at least one embodiment". The term "another embodiment" means "at least one another embodiment". The term "some embodiments" means "at least some embodiments". The term "in response to" and a related term mean that a signal or event is affected by another signal or event to an extent, but is not necessarily fully or directly affected. If an event x occurs "in response to" an event y, x may respond directly or indirectly to y. For example, the occurrence of y may finally lead to the occurrence of x, but there may be other intermediate events and/or conditions. In other situations, the occurrence of y may not necessarily lead to the occurrence of x, that is, even if y has not occurred, x may occur. Moreover, the term "in response to" may also mean "at least partially in response to".

The term "determine" broadly encompasses a wide variety of actions, which may include obtaining, computing, calculating, processing, deriving, investigating, looking up (for example, looking up in a sheet, a database, or other data structures), ascertaining, or similar actions, and may further include receiving (for example, receiving information), accessing (for example, accessing data in a memory), or similar actions, and parsing, selecting, choosing, establishing, and similar actions, and the like. Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence thereof.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

For the purpose of the present disclosure, the phrase "A and/or B" means (A), (B), or (A and B).

The names of messages or information exchanged between a plurality of apparatuses in the implementations of the present disclosure are used for illustrative purposes only, and are not used to limit the scope of these messages or information.

It should be noted that the steps of obtaining personal data of a user in the present disclosure is performed with the authorization of the user, for example, in response to receiving an active request from the user, prompt information is sent to the user to explicitly inform the user that the requested operation will require the acquisition and use of the personal information of the user. As such, the user can independently choose, based on the prompt information, whether to provide the personal information to software or hardware, such as an electronic device, an application program, a server, or a storage medium, that performs operations in the technical solutions of the present disclosure. As an optional but non-limiting implementation, in response to the reception of the active request from the user, the prompt information may be sent to the user in the form of, for example, a pop-up window, in which the prompt information may be presented in text. Furthermore, the pop-up window may further include a selection control for the user to choose whether to "agree" or "disagree" to provide the personal information to the electronic device. It can be understood that the above process of notifying and obtaining the authorization of the user is only illustrative and does not constitute a limitation on the implementations of the present disclosure, and other manners that satisfy the relevant laws and regulations may also be applied in the implementations of the present disclosure. It can be understood that the data involved in the technical solutions (including, but not limited to, the data itself and the access to or use of the data) shall comply with the requirements of corresponding laws, regulations, and relevant provisions.

The explanation of the relevant technical terms is as follows:

(1) A world coordinate system, also known as an absolute coordinate system, is a coordinate system that is followed by all objects in a scene, in which unique position and direction information of each object in a scene may be marked. In some embodiments of the present disclosure, the world coordinate system may include a world rectangular coordinate system. Coordinates in the world coordinate system may be referred to as world coordinates.

(2) A local coordinate system, also known as a relative coordinate system, is a coordinate system with a position of an object as the origin and for representing a relative position and direction between objects. The local coordinate system can rotate as the object rotates. In some embodiments of the present disclosure, the local coordinate system may include a local rectangular coordinate system and a local spherical coordinate system. Coordinates in the local coordinate system may be referred to as local coordinates.

The method for moving a virtual object provided in one or more embodiments of the present disclosure employs an extended reality (XR) technology. The extended reality technology can combine reality with virtuality through a computer to provide a user with a virtual reality space that allows for human-computer interaction. In the virtual reality space, the user may implement social interaction, entertainment, learning, working, telecommuting, creation of user generated content (UGC), etc., via an extended reality device such as a head-mounted display (HMD).

Referring to FIG. 1, the user may enter the virtual reality space via the extended reality device such as the head-mounted display, and control his/her own virtual character (Avatar) in the virtual reality space for social interaction with virtual characters controlled by other users, entertainment, learning, telecommuting, etc.

The extended reality device described in the embodiments of the present disclosure may include, but is not limited to, the following types:

a personal computer extended reality (PCXR) device which performs computation related to an extended reality function and data output by using a PC, where an external personal computer extended reality device achieves extended reality effects by using data output by the PC;

a mobile extended reality device which supports setting of a mobile terminal (for example, a smartphone) in various manners (for example, a head-mounted display provided with a special slot), and is connected to the mobile terminal in a wired or wireless manner, where the mobile terminal performs computation related to an extended reality function, and outputs data to the mobile extended reality device, for example, an extended reality video is watched through an application on the mobile terminal; and an integrated extended reality device which has a processor configured to perform computation related to a virtual function, and therefore has an independent extended reality input and output function, with no need to be connected to a PC or a mobile terminal, providing a high degree of freedom of use.

Certainly, an implementation form of the extended reality device is not limited thereto, and the device may be further miniaturized or enlarged as needed.

A posture detection sensor (for example, a nine-axis sensor) is provided in the extended reality device for detecting a posture change of the extended reality device in real time. If the user wears the extended reality device, areal-time posture of the head of the user is transmitted to a processor when a posture of the head changes, so as to calculate a fixation point of a line of sight of the user in a virtual environment, and calculate an image in a fixation range of the user (i.e., a virtual field of view) in a three-dimensional model of the virtual environment based on the fixation point. The image is displayed on a display screen, providing immersive experience that the user feels like watching in the real environment.

Figure 2:
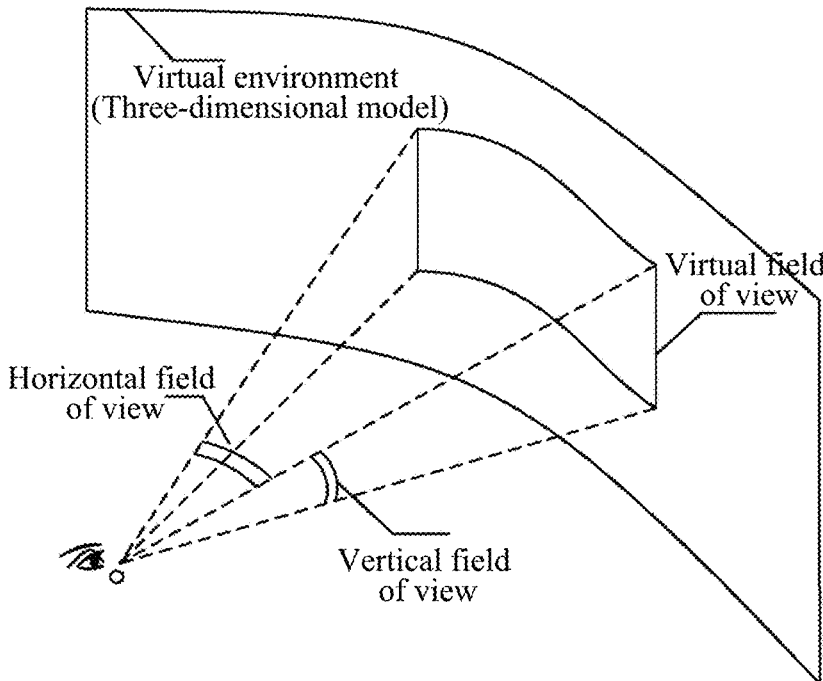
FIG. 2 is an optional schematic diagram of a virtual field of view of an extended reality device according to an embodiment of the present disclosure.

FIG. 2 is an optional schematic diagram of a virtual field of view of an extended reality device according to an embodiment of the present disclosure. A distribution range of the virtual field of view in the virtual environment is described using a horizontal field of view and a vertical field of view, where the distribution range in a vertical direction is represented by the vertical field of view BOC, and the distribution range in a horizontal direction is represented by the horizontal field of view AOB, such that a human eye is always able to perceive, through a lens, an image in the virtual environment that is located in the virtual field of view. It can be understood that a larger field of view means a larger virtual field of view, which allows the user to perceive a larger region of the virtual environment. The field of view represents a distribution range of a viewing angle formed when the environment is perceived through the lens. For example, a field of view of the extended reality device represents a distribution range of a viewing angle of the human eye formed when the virtual environment is perceived through a lens of the extended reality device. For another example, for a mobile terminal provided with a camera, a field of view of the camera is a distribution range of a viewing angle formed when the camera perceives a real environment for shooting.

The extended reality device, such as an HMD, is integrated with a number of cameras (for example, a depth camera, an RGB camera, etc.), which are not limited to providing pass-through views. A camera image and an integrated inertial measurement unit (IMU) provide data that may be processed by a computer vision method to automatically analyze and understand the environment. In addition, the HMD is designed to support not only passive computer vision analysis but also active computer vision analysis. In passive computer vision methods, image information captured from the environment is analyzed. The methods may be monoscopic (images from a single camera) or stereoscopic (images from two cameras). The methods include, but are not limited to, feature tracking, object recognition, and depth estimation. In active computer vision methods, information is added to the environment by projecting patterns that are visible to the camera but not necessarily visible to a human visual system. Such techniques include a time-of-flight (ToF) camera, laser scanning, or structured light to simplify the stereo matching problem. Active computer vision is used for implementing scene depth reconstruction.

FIG. 3 shows a flow diagram of a method 100 for moving a virtual object according to an embodiment of the present disclosure. In some embodiments, the method 100 is performed on an electronic device (e.g., a head-mounted display shown in FIG. 1 or an electronic device shown in FIG. 5), which may communicate with a display generation component (e.g., a display screen) and one or more input devices (e.g., an eye tracking device, a hand tracking device, a camera, or other input devices). In some embodiments, the display generation component may be integrated on the electronic device; and the input device may be integrated with or external to the electronic device, but the present disclosure is not limited thereto. In some embodiments, the input device may be a handheld controller. In some other embodiments, the input device may be a camera integrated with the head-mounted display.

The method 100 includes step S110 to step S160.

Step S110: Display, by the display generation component, a computer-generated three-dimensional environment.

In some embodiments, the three-dimensional environment (the virtual reality space) may be a simulated environment of a real world, a semi-simulated and semi-fictional virtual scene, or a purely fictional virtual scene, which is not limited in the present disclosure. The virtual scene may be any one of a two-dimensional virtual scene, a 2.5-dimensional virtual scene, or a three-dimensional virtual scene. A dimensionality of the virtual scene is not limited in this embodiment of the present application. For example, the virtual scene may include sky, land, and sea, and the land may include environmental elements such as a desert and a city. The user may control a virtual object to move in the virtual scene.

Step S120: Detect, by the input device, position data of an interactor, and determine, by the input device and based on the position data, a first movement vector of the interactor in a world rectangular coordinate system.

In some embodiments, the interactor includes an interaction control device (such as the handheld controller) or a body part (such as a hand, a head, a foot, an eye) used by the user for interaction in the three-dimensional environment, or a visual representation of the control device or body part in the three-dimensional environment, such as a virtual model displayed in the three-dimensional environment that is configured to reflect an actual pose of the controller or hand.

In some embodiments, the input device may detect the position data of the interactor based on a detection mode of motion sensing or a detection mode of computer vision. For example, a pose of a body part (such as a hand) of the user may be detected based on a camera (such as a depth camera) through a computer vision-based motion tracking algorithm, or the pose of the body part (e.g., six-degree-of-freedom data) may be detected by a tracking device (e.g., the handheld controller) held in or worn on the body part, but the present disclosure is not limited thereto. The six degrees of freedom include translational degrees of freedom along three rectangular coordinate axes x, y, z, and rotational degrees of freedom around the three coordinate axes, which are forward/backward, up/down, left/right, pitch, yaw, and roll, totaling 6 degrees of freedom.

In some embodiments, the HMD is integrated with a hand tracking device through which hand information of the user, such as user gestures, may be obtained. The hand tracking device is part of the HMD (e.g., embedded in or attached to the head mounted device).

In some embodiments, the hand tracking device include an image sensor (e.g., one or more infrared cameras, 3D cameras, depth cameras, and/or color cameras, etc.) that captures three dimensional scene information including at least a hand of a human user. The image sensor captures an image of the hand with sufficient resolution that allows for fingers and their corresponding positions to be distinguished.

In some embodiments, the hand tracking device captures and processes a time series containing a depth map of the hand of the user as the user moves their hand (e.g., the entire hand or one or more fingers). Software running on the image sensor and a processor of the HMD processes 3D map data to extract image block descriptors of the hand in these depth maps. The software may match these descriptors to image block descriptors stored in a database based on a previous learning process, in order to estimate the pose of the hand in each frame. The pose usually includes a 3D position of a hand joint and a fingertip of the user. The software may also analyze a trajectory of the hand and/or finger on a plurality of frames in the series, for identifying gestures. A pose estimation function described herein may be alternated with a motion tracking function such that image block-based pose estimation is performed only once every two (or more) frames, while tracking is used to find a change in pose occurring over the remaining frames, and provide pose, motion, and gesture information to an application program running on the HMD. In response to the pose and/or gesture information, the program may, for example, move and modify an image presented on the HMD display generation component, or execute other functions, for example executing control instructions corresponding to the gestures, etc.

In some embodiments, the HMD is integrated with a gaze tracking device, through which visual information of the user, such as gaze and a gaze point of the user, may be obtained. In an embodiment, the gaze tracking device includes at least one eye tracking camera (e.g., an infrared (IR) or near infrared (NIR) camera) and an illumination source that emits light toward the eyes of the user (an infrared or near infrared light source, such as an array or ring of LEDs). The eye tracking camera may be directed to the eye of the user to receive infrared or near-infrared light reflected directly by the light source from the eye, or alternatively may be directed to "hot" mirrors located between the eye of the user and a display panel that reflects infrared or near-infrared light from the eye to the eye tracking camera while allowing visible light to pass through. The gaze tracking device optionally captures images of the eye of the user (e.g., as a video stream captured at 60-120 frames per second (fps)), analyzes these images to generate gaze tracking information, and transmits gaze tracking information to the HMD, so that some human-machine interaction function can be implemented based on the gaze information of the user, for example, implementing gaze information-based content navigation. In some embodiments, two eyes of the user are tracked separately by respective eye tracking cameras and illumination sources. In some embodiments, only one eye of the user is tracked by a corresponding eye tracking camera and illumination source.

In some embodiments, the first movement vector is a movement vector of the interactor relative to the user in the world rectangular coordinate system. A movement vector of the interactor relative to the user may be determined based on a movement vector of the interactor in the world rectangular coordinate system and a movement vector of the user in the world rectangular coordinate system. In a specific implementation, the first movement vector may be obtained by subtracting a movement vector of the head-mounted display worn by the user in the world rectangular coordinate system from the movement vector of the interactor in the world rectangular coordinate system, but the present disclosure is not limited thereto.

Step S130: Determine, based on the first movement vector, a second movement vector of the interactor in a local rectangular coordinate system with a user's own position as an origin.

Figure 4:
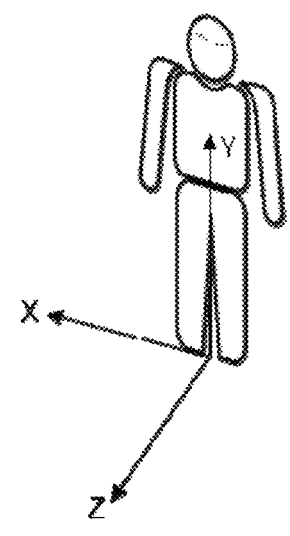
FIG. 4 is a schematic diagram of a local rectangular coordinate system with a user as an origin according to an embodiment of the present disclosure.

The second movement vector is a movement vector of the interactor in the local rectangular coordinate system with the user's own position as an origin. In this embodiment, the movement vector of interactor in the world coordinate rectangular coordinate system is convert to a movement vector in a user-centric local rectangular coordinate system, so that the movement of the interactor (such as the hand or controller) is always user-centric, regardless of a direction of the world rectangular coordinate system toward which the user is facing. In a specific implementation, as shown in FIG. 4, in the user-centric local rectangular coordinate system, horizontal movement of the interactor relative to the user is equivalent to movement in the direction of the X-axis of the local rectangular coordinate system, longitudinal movement of the interactor relative to the user may be equivalent to movement in the direction of Y-axis of the rectangular coordinate system, and forward and backward movement of the interactor relative to the user may be equivalent to movement in the direction of the Z-axis of the local rectangular coordinate system, but the present disclosure is not limited thereto.

Step S140: Determine, based on the second movement vector, a third movement vector of the interactor in a local spherical coordinate system with the user's own position as an origin.

Step S150: Determine, based on the third movement vector, a fourth movement vector of a target virtual object in the three-dimensional environment in the local spherical coordinate system.

In some embodiments, the target virtual object is an object in the three-dimensional environment that the user intends to interact with (e.g., move, drag). In a specific implementation, an object that the user is gazing at may be determined as the target virtual object. For example, a cone projection may be performed based on tracking of eye movement and a posture of the user, and a target virtual object displayed in the virtual reality space may be determined based on the cone projection. Furthermore, the target virtual object may also be determined by other relevant eye tracking techniques, which is not limited in the present disclosure. In a specific implementation, an object to which a virtual ray is directed may be used as the target virtual object, where the virtual ray has its direction changed based on a pose of the interactor in a real space, such that the user can manipulate the controller to select the virtual object in the three-dimensional environment by the virtual ray. In some embodiments, the target virtual object may be a 3D object.

Step S160: Obtain second coordinates of the target virtual object in the local spherical coordinate system based on first coordinates of the target virtual object currently in the local spherical coordinate system and the fourth movement vector.

The third movement vector is a movement vector of the interactor in the local spherical coordinate system with the user's own position as an origin; and the fourth movement vector is a movement vector of the target virtual object in the local spherical coordinate system.

The first coordinates are coordinates of the target virtual object before movement, in a user-centered local spherical coordinate system, and the second coordinates are coordinates of the target virtual object after movement, in the user-centered local spherical coordinate system.

In some embodiments, addition operation may be performed on the first coordinates and the fourth movement vector in the user-centric local spherical coordinate system, to obtain the second coordinates.

In this embodiment, the movement vector (i.e. the second movement vector) of the interactor in the user-centric local rectangular coordinate system is converted into the movement vector (i.e. the third movement vector) of the interactor in the user-centric local spherical coordinate system, and based on this, the movement vector of the target virtual object in the local spherical coordinate system (i.e. a fourth movement vector) is determined, so that the moving mode of the target virtual object is rotation around the user as a center, rather than simply movement toward right and left. Hence, it is more consistent with the self-centric perception of the user in the extended reality environment.

In this way, according to one or more embodiments of the present disclosure, the first movement vector of the interactor in the world rectangular coordinate system is converted into the second movement vector of the interactor in the user local rectangular coordinate system, and the second movement vector is converted into the third movement vector of the interactor in the user local spherical coordinate system, and based on this, the movement vector of the target virtual object and the coordinates thereof after movement in the user local spherical coordinate system are determined, so that when the user moves the virtual object in the three-dimensional environment, the moved object can be rotated around the user as a center, rather than simply translating right and left or up and down. Hence, it is more consistent with the self-centric perception of the user in the extended reality environment, allowing for increased efficiency of interaction of the user in the extended reality space. In addition, when the user faces the virtual object in different directions, the moving space of the virtual object rotates with the orientation of the user, so the user's experience of manipulating the virtual object is consistent when facing the virtual object in any direction.

According to one or more embodiments of the present disclosure, with reference to FIG. 4, when the interactor moves horizontally in the direction of the X-axis in the user-centric local coordinate system (e.g., the movement vector is (x, 0, 0)), the target virtual object may be moved horizontally and circumferentially on a sphere centered on the user, where a distance between the target virtual object and the user (i.e. a radius r in the spherical coordinate system) is kept constant; and when the interactor moves longitudinally in the direction of the Y-axis in the user-centric local coordinate system (e.g., the movement vector is (0, y, 0)), the target virtual object may be moved longitudinally and circumferentially on the sphere centered on the user, where the distance between the target virtual object and the user (i.e. the radius r in the spherical coordinate system) is kept constant; and when the interactor moves forward and backward in the direction of the z-axis in the user-centric local coordinate system (e.g., the movement vector is (0, 0, z)), the distance between the target virtual object and the user may be changed accordingly.

In this way, by means of the "world rectangular coordinate system-local rectangular coordinate system-local spherical coordinate system" conversion method provided in the above embodiments, the moving position of the object is determined, thus forming a uniform, user-centric drag algorithm, which is more consistent with the self-centric perception of the user, thereby improving the efficiency of interaction of the user in the extended reality space.

In some embodiments, there is a conversion ratio relationship between the third movement vector and the fourth movement vector. The conversion ratio relationship may be determined based on the distance between the target virtual object and the user and/or a movement speed of the interactor. For example, the farther the distance between the target virtual object and the user is or the faster the interactor moves, the higher the conversion ratio is, which ultimately results in the larger moving distance of the target virtual object.

In some embodiments, third coordinates of the target virtual object in the world rectangular coordinate system may further be determine based on the second coordinates. In this embodiment, by calculating a position of the target virtual object in the world rectangular coordinate system, an absolute position of the target virtual object in the same coordinate system may be further determined.

In some embodiments, the second coordinates and/or third coordinates may also be sent to a requestor requesting a position of the target virtual object for use by the requestor.

In some embodiments, coordinates of the target virtual object in the local rectangular coordinate system and/or the local spherical coordinate system may further be recalculated based on the third coordinates. On the basis of the coordinates, the position at which the target virtual object is moved the next time (e.g., in the next frame) may be calculated. Furthermore, since the local coordinate system rotates with the rotation of the user, the accuracy of this solution can be further improved by recalculating the coordinates of the target virtual object in the local coordinate.

Figure 5:
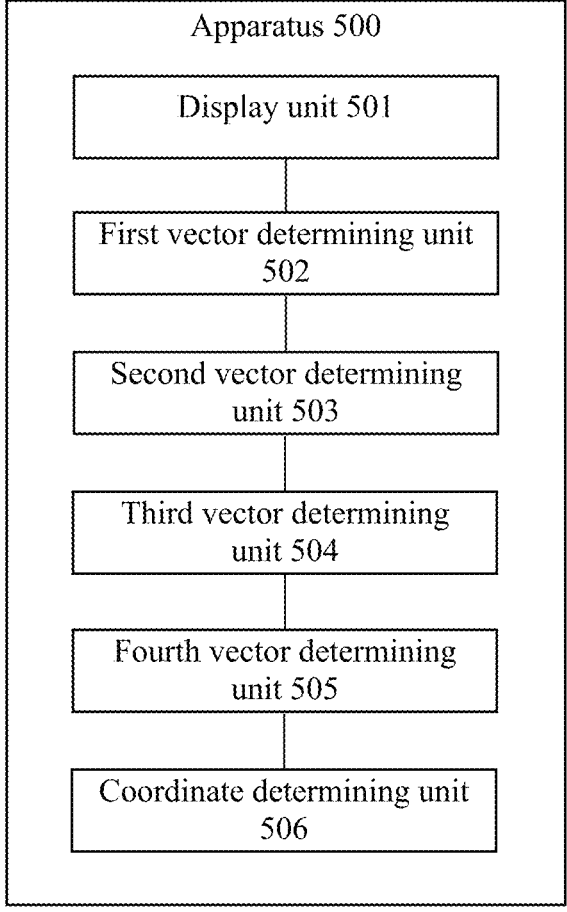
FIG. 5 is a schematic diagram of a structure of an apparatus for moving a virtual object according to an embodiment of the present disclosure.

Accordingly, with reference to FIG. 5, according to an embodiment of the present disclosure, there is provided an apparatus 500 for moving a virtual object. The apparatus 500 includes:

a display unit 501 configured to display a computer-generated three-dimensional environment;

a first vector determination unit 502 configured to determine, based on position data of an interactor detected by an input device, a first movement vector of the interactor in a world rectangular coordinate system;

a second vector determination unit 503 configured to determine, based on the first movement vector, a second movement vector of the interactor in a local rectangular coordinate system with a user's own position as an origin;

a third vector determination unit 504 configured to determine, based on the second movement vector, a third movement vector of the interactor in a local spherical coordinate system with the user's own position as an origin;

a fourth vector determination unit 505 configured to determine, based on the third movement vector, a fourth movement vector of a target virtual object in the three-dimensional environment in the local spherical coordinate system; and a coordinates determination unit 506 configured to obtain second coordinates of the target virtual object in the local spherical coordinate system based on first coordinates of the target virtual object currently in the local spherical coordinate system and the fourth movement vector.

In some embodiments, the apparatus further includes:

a third-coordinates determination unit configured to determine, based on the second coordinates, third coordinates of the target virtual object in the world rectangular coordinate system.

In some embodiments, the apparatus further includes:

a coordinate sending unit configured to send the second coordinates and/or the third coordinates to a requestor requesting a position of the target virtual object.

In some embodiments, the apparatus further includes:

a coordinate updating unit configured to recalculate, based on the third coordinates, coordinates of the target virtual object in the local rectangular coordinate system and/or the local spherical coordinate system.

In some embodiments, a fourth vector determination unit is configured to determine the fourth movement vector based on the third movement vector and a distance between the target virtual object in the three-dimensional environment and the user.

In some embodiments, the first movement vector is a movement vector of the interactor relative to the user.

In some embodiments, the interactor includes an interaction control device or a body part of the user.

In some embodiments, the target virtual object includes a three-dimensional object.

In some embodiments, the apparatus further includes:

an object determination unit configured to determine a virtual object in the three-dimensional environment at which the user is gazing as the target virtual object.

The apparatus embodiments are substantially corresponding to the method embodiments, and therefore reference of a related part may be made to the descriptions of the part in the method embodiments. The apparatus embodiments described above are only illustrative, and the modules described as separate modules therein may or may not be separate. Some or all of the modules may be selected according to actual needs to achieve the objectives of the solutions of the embodiments, which can be understood and implemented by those of ordinary skill in the art without involving any inventive effort.

Accordingly, according to one or more embodiments of the present disclosure, there is provided an electronic device. The electronic device includes:

at least one memory and at least one processor, where the memory is configured to store program code, and the processor is configured to call the program code stored in the memory, to cause the electronic device to perform the method for moving a virtual object according to one or more embodiments of the present disclosure.

Accordingly, according to one or more embodiments of the present disclosure, there is provided a non-transitory computer storage medium storing program code that is executable by a computer device to cause the computer device to perform the method for moving a virtual object according to one or more embodiments of the present disclosure.

Figure 6:
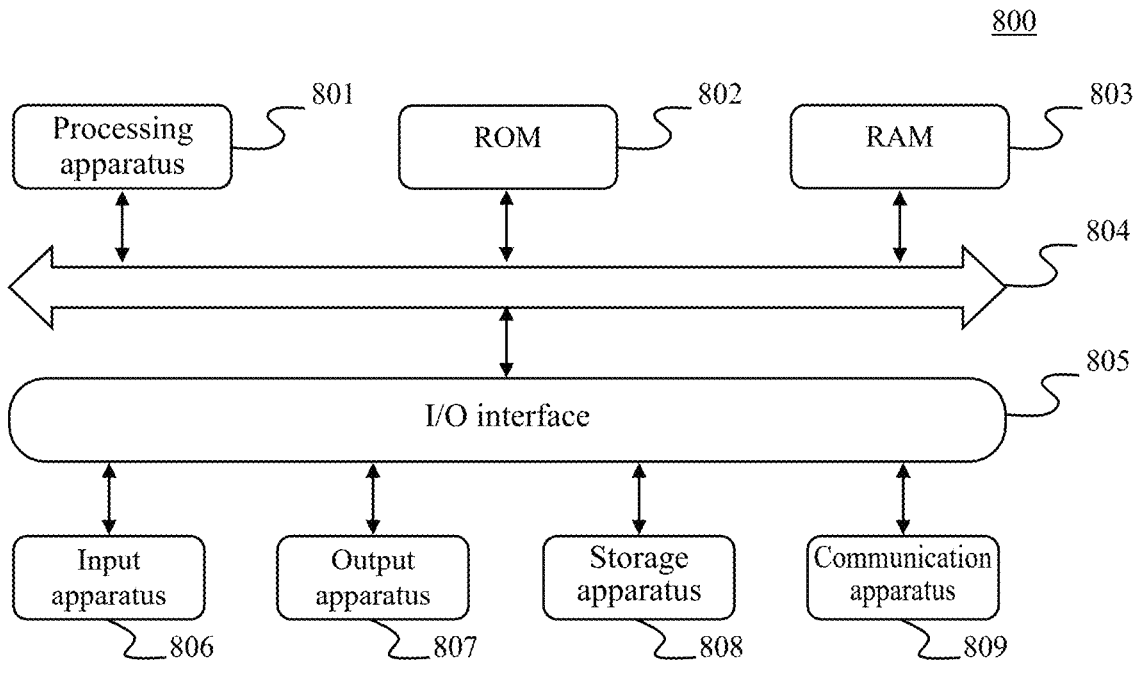
FIG. 6 is a schematic diagram of a structure of an electronic device according to an embodiment of the present disclosure.

Reference is made to FIG. 6 below, which is a schematic diagram of a structure of an electronic device 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a PAD (tablet computer), a portable multimedia player (PMP), and a vehicle-mounted terminal (such as a vehicle navigation terminal), and a head-mounted display. The electronic device shown in FIG. 6 is merely an example, and shall not impose any limitation on the function and scope of use of the embodiments of the present disclosure.

As shown in FIG. 6, the electronic device 800 may include a processing apparatus (e.g., a central processing unit or a graphics processing unit) 801 that may perform a variety of appropriate actions and processing in accordance with a program stored in a read-only memory (ROM) 802 or a program loaded from a storage apparatus 808 into a random access memory (RAM) 803. The RAM 803 further stores various programs and data required for operations of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touchscreen, a touchpad, a keyboard, a mouse, a camera, a microphone, an accelerometer, and a gyroscope; an output apparatus 807 including, for example, a liquid crystal display (LCD), a speaker, and a vibrator; the storage apparatus 808 including, for example, a tape and a hard disk; and a communication apparatus 809. The communication apparatus 809 may allow the electronic device 800 to perform wireless or wired communication with other devices to exchange data. Although FIG. 6 shows the electronic device 800 having various apparatuses, it should be understood that it is not required to implement or have all of the apparatuses shown. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 809 and installed, installed from the storage apparatus 808, or installed from the ROM 802. When the computer program is executed by the processing apparatus 801, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the above method according to the present disclosure.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a unit does not constitute a limitation on the unit itself under certain circumstances.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

According to one or more embodiments of the present disclosure, there is provided a method for moving a virtual object. The method includes: performing the following steps at an electronic device in communication with a display generation component and an input device: displaying, by the display generation component, a computer-generated three-dimensional environment; detecting, by the input device, position data of an interactor and determining, by the input device and based on the position data, a first movement vector of the interactor in a world rectangular coordinate system; determining, based on the first movement vector, a second movement vector of the interactor in a local rectangular coordinate system with a user's own position as an origin; determining, based on the second movement vector, a third movement vector of the interactor in a local spherical coordinate system with the user's own position as an origin; determining, based on the third movement vector, a fourth movement vector of a target virtual object in the three-dimensional environment in the local spherical coordinate system; and obtaining second coordinates of the target virtual object in the local spherical coordinate system based on first coordinates of the target virtual object currently in the local spherical coordinate system and the fourth movement vector.

The method according to one or more embodiments of the present disclosure further includes: determining, based on the second coordinates, third coordinates of the target virtual object in the world rectangular coordinate system.

The method according to one or more embodiments of the present disclosure further includes: sending the second coordinates and/or the third coordinates to a requestor requesting a position of the target virtual object.

The method according to one or more embodiments of the present disclosure further includes: recalculating, based on the third coordinates, coordinates of the target virtual object in the local rectangular coordinate system and/or the local spherical coordinate system.

According to one or more embodiments of the present disclosure, the determining, based on the third movement vector, a fourth movement vector of a target virtual object in the three-dimensional environment in the local spherical coordinate system includes: determining the fourth movement vector based on the third movement vector and a distance between the user and the target virtual object in the three-dimensional environment.

According to one or more embodiments of the present disclosure, the first movement vector is a movement vector of the interactor relative to the user.

According to one or more embodiments of the present disclosure, the interactor includes an interaction control device or a body part of the user.

According to one or more embodiments of the present disclosure, the target virtual object includes a three-dimensional object.

The method according to one or more embodiments of the present disclosure further includes: determining a virtual object in the three-dimensional environment at which the user is gazing as the target virtual object.

According to one or more embodiments of the present disclosure, there is provided an apparatus for moving a virtual object. The apparatus includes: a display unit configured to display a computer-generated three-dimensional environment; a first vector determination unit configured to determine, based on position data of an interactor detected by an input device, a first movement vector of the interactor in a world rectangular coordinate system; a second vector determination unit configured to determine, based on the first movement vector, a second movement vector of the interactor in a local rectangular coordinate system with a user's own position as an origin; a third vector determination unit configured to determine, based on the second movement vector, a third movement vector of the interactor in a local spherical coordinate system with the user's own position as an origin; a fourth vector determination unit configured to determine, based on the third movement vector, a fourth movement vector of a target virtual object in the three-dimensional environment in the local spherical coordinate system; and a coordinates determination unit configured to obtain second coordinates of the target virtual object in the local spherical coordinate system based on first coordinates of the target virtual object currently in the local spherical coordinate system and the fourth movement vector.

According to one or more embodiments of the present disclosure, there is provided an electronic device, including at least one memory and at least one processor, where the memory is configured to store program code, and the processor is configured to call the program code stored in the memory, to cause the electronic device to perform the method for moving a virtual object according to one or more embodiments of the present disclosure.

According to one or more embodiments of the present disclosure, there is provided a non-transitory computer storage medium storing program code that is executable by a computer device to cause the computer device to perform the method for moving a virtual object according to one or more embodiments of the present disclosure.

Extended reality (XR) technology can combine reality with virtuality through a computer to provide a user with a three-dimensional environment that allows for human-machine interaction.

In related extended reality solutions, there are two methods to drag a 2D virtual object in a three-dimensional environment:

Method 1: A movement of a hand of the user (or a controller) is projected onto a plane where the 2D virtual object is located, as a movement of the 2D virtual object. A disadvantage of the method is that as an included angle between a direction of movement of the hand and the plane where the 2D virtual object is located becomes larger, the projection becomes smaller, which results in a shorter movement distance for the 2D virtual object, leading to a situation where it feels increasingly "difficult to drag".

Method 2: On the basis of the method 1, a movement distance of the hand (or the controller) is further used as the movement distance of the 2D virtual object. A disadvantage of this method is that regardless of how the user is oriented toward the 2D virtual object or the angle at which they move the hand (or the controller), the movement distance of the object is always equal to that of the hand (or the controller), which does not align with the intuitive perception of the user.

The method for controlling a virtual object provided in one or more embodiments of the present disclosure employs an extended reality (XR) technology. The extended reality technology can combine reality with virtuality through a computer to provide a user with a virtual reality space that allows for human-computer interaction. In the virtual reality space, the user may implement social interaction, entertainment, learning, working, and telecommuting, etc., via an extended reality device such as a head-mounted display (HMD).

Figure 7:
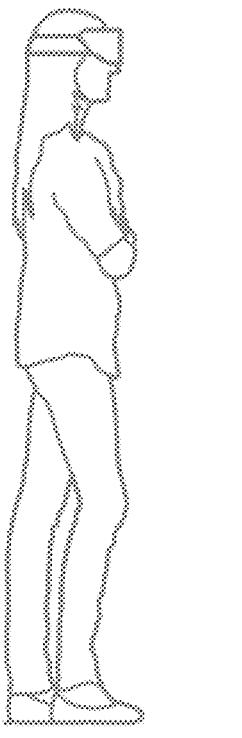
FIG. 7 is a schematic diagram of an extended reality device according to an embodiment of the present disclosure.

Referring to FIG. 7, the user may enter the virtual reality space via the extended reality device such as the head-mounted display, and control his/her own virtual character (Avatar) in the virtual reality space for social interaction with virtual characters controlled by other users, entertainment, learning, telecommuting, etc.

Certainly, an implementation form of the extended reality device is not limited thereto, and the device may be further miniaturized or enlarged as needed.

A posture detection sensor (for example, a nine-axis sensor) is provided in the extended reality device for detecting a posture change of the extended reality device in real time. If the user wears the extended reality device, a real-time posture of the head of the user is transmitted to a processor when a posture of the head changes, so as to calculate a fixation point of a line of sight of the user in a virtual environment, and calculate an image in a fixation range of the user (i.e., a virtual field of view) in a three-dimensional model of the virtual environment based on the fixation point. The image is displayed on a display screen, providing immersive experience that the user feels like watching in the real environment.

Figure 8:
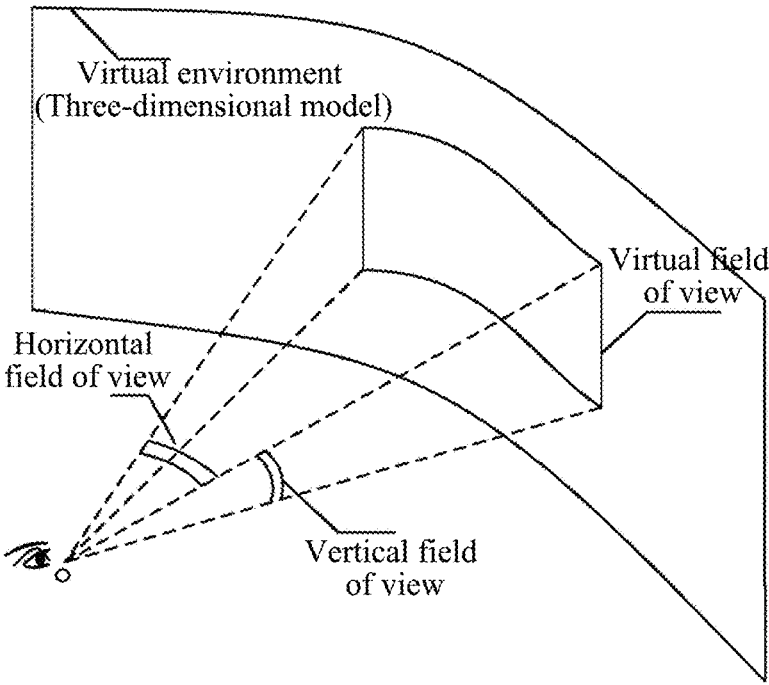
FIG. 8 is an optional schematic diagram of a virtual field of view of an extended reality device according to an embodiment of the present disclosure.

FIG. 8 is an optional schematic diagram of a virtual field of view of an extended reality device according to an embodiment of the present disclosure. A distribution range of the virtual field of view in the virtual environment is described using a horizontal field of view and a vertical field of view, where the distribution range in a vertical direction is represented by the vertical field of view BOC, and the distribution range in a horizontal direction is represented by the horizontal field of view AOB, such that a human eye is always able to perceive, through a lens, an image in the virtual environment that is located in the virtual field of view. It can be understood that a larger field of view means a larger virtual field of view, which allows the user to perceive a larger region of the virtual environment. The field of view represents a distribution range of a viewing angle formed when the environment is perceived through the lens. For example, a field of view of the extended reality device represents a distribution range of a viewing angle of the human eye formed when the virtual environment is perceived through a lens of the extended reality device. For another example, for a mobile terminal provided with a camera, a field of view of the camera is a distribution range of a viewing angle formed when the camera perceives a real environment for shooting.

The extended reality device, such as an HMD, is integrated with a number of cameras (for example, a depth camera, an RGB camera, etc.), which are not limited to providing pass-through views. A camera image and an integrated inertial measurement unit (IMU) provide data that may be processed by a computer vision method to automatically analyze and understand the environment. In addition, the HMD is designed to support not only passive computer vision analysis but also active computer vision analysis. In passive computer vision methods, image information captured from the environment is analyzed. The methods may be monoscopic (images from a single camera) or stereoscopic (images from two cameras). The methods include, but are not limited to, feature tracking, object recognition, and depth estimation. In active computer vision methods, information is added to the environment by projecting patterns that are visible to the camera but not necessarily visible to a human visual system. Such techniques include a time-of-flight (ToF) camera, laser scanning, or structured light to simplify the stereo matching problem. Active computer vision is used for implementing scene depth reconstruction.

FIG. 9 shows a flow diagram of a method 9-100 for controlling a virtual object according to an embodiment of the present disclosure. In some embodiments, the method 9-100 is performed on an electronic device (e.g., a head-mounted display shown in FIG. 7 or an electronic device shown in FIG. 11), which may communicate with a display generation component (e.g., a display screen) and one or more input devices (e.g., an eye tracking device, a hand tracking device, a camera, or other input devices). In some embodiments, the display generation component may be integrated on the electronic device; and the input device may be integrated with or external to the electronic device, but the present disclosure is not limited thereto. In some embodiments, the input device may be a handheld controller.

In some other embodiments, the input device may be a camera integrated with the head-mounted display.

The method 9-100 includes step S9-110 to step S9-170.

Step S9-110: Display, by the display generation component, a computer-generated three-dimensional environment.

In some embodiments, the three-dimensional environment (the virtual reality space) may be a simulated environment of a real world, a semi-simulated and semi-fictional virtual scene, or a purely fictional virtual scene, which is not limited in the present disclosure. The virtual scene may be any one of a two-dimensional virtual scene, a 2.5-dimensional virtual scene, or a three-dimensional virtual scene. A dimensionality of the virtual scene is not limited in this embodiment of the present application. For example, the virtual scene may include sky, land, and sea, and the land may include environmental elements such as a desert and a city. The user may control a virtual object to move in the virtual scene.

Step S9-120: Detect, by the input device, position data of an interactor and determine, by the input device and based on the position data, a first movement vector of the interactor.

In some embodiments, the interactor includes an interaction control device (such as the handheld controller) or a body part (such as a hand, a head, a foot, an eye) used by the user for interaction in the three-dimensional environment, or a visual representation of the control device or body part in the three-dimensional environment, such as a virtual model displayed in the three-dimensional environment that is configured to reflect an actual pose of the controller or hand.

In some embodiments, the input device may detect the position data of the interactor based on a detection mode of motion sensing or a detection mode of computer vision. For example, a pose of a body part (such as a hand) of the user may be detected based on a camera (such as a depth camera) through a computer vision-based motion tracking algorithm, or the pose of the body part (e.g., six-degree-of-freedom data) may be detected by a tracking device (e.g., the handheld controller) held in or worn on the body part, but the present disclosure is not limited thereto. The six degrees of freedom include translational degrees of freedom along three rectangular coordinate axes x, y, z, and rotational degrees of freedom around the three coordinate axes, which are forward/backward, up/down, left/right, pitch, yaw, and roll, totaling 6 degrees of freedom.

In some embodiments, the HMD is integrated with a hand tracking device through which hand information of the user, such as user gestures, may be obtained. The hand tracking device is part of the HMD (e.g., embedded in or attached to the head mounted device).

In some embodiments, the hand tracking device include an image sensor (e.g., one or more infrared cameras, 3D cameras, depth cameras, and/or color cameras, etc.) that captures three dimensional scene information including at least a hand of a human user. The image sensor captures an image of the hand with sufficient resolution that allows for fingers and their corresponding positions to be distinguished.

In some embodiments, the hand tracking device captures and processes a time series containing a depth map of the hand of the user as the user moves their hand (e.g., the entire hand or one or more fingers). Software running on the image sensor and a processor of the HMD processes 3D map data to extract image block descriptors of the hand in these depth maps. The software may match these descriptors to image block descriptors stored in a database based on a previous learning process, in order to estimate the pose of the hand in each frame. The pose usually includes a 3D position of a hand joint and a fingertip of the user. The software may also analyze a trajectory of the hand and/or finger on a plurality of frames in the series, for identifying gestures. A pose estimation function described herein may be alternated with a motion tracking function such that image block-based pose estimation is performed only once every two (or more) frames, while tracking is used to find a change in pose occurring over the remaining frames and provide pose, motion, and gesture information to an application program running on the HMD. In response to the pose and/or gesture information, the program may, for example, move and modify an image presented on the HMD display generation component, or execute other functions, for example executing control instructions corresponding to the gestures, etc.

In some embodiments, the HMD is integrated with a gaze tracking device, through which visual information of the user, such as gaze and a gaze point of the user, may be obtained. In an embodiment, the gaze tracking device includes at least one eye tracking camera (e.g., an infrared (IR) or near infrared (NIR) camera) and an illumination source that emits light toward the eyes of the user (an infrared or near infrared light source, such as an array or ring of LEDs). The eye tracking camera may be directed to the eye of the user to receive infrared or near-infrared light reflected directly by the light source from the eye, or alternatively may be directed to "hot" mirrors located between the eye of the user and a display panel that reflects infrared or near-infrared light from the eye to the eye tracking camera while allowing visible light to pass through. The gaze tracking device optionally captures images of the eye of the user (e.g., as a video stream captured at 60-120 frames per second (fps)), analyzes these images to generate gaze tracking information, and transmits gaze tracking information to the HMD, so that some human-machine interaction function can be implemented based on the gaze information of the user, for example, implementing gaze information-based content navigation. In some embodiments, two eyes of the user are tracked separately by respective eye tracking cameras and illumination sources. In some embodiments, only one eye of the user is tracked by a corresponding eye tracking camera and illumination source.

In some embodiments, the first movement vector is a movement vector of the interactor relative to the user in the world coordinate system. A movement vector of the interactor relative to the user may be determined based on a movement vector of the interactor in the world coordinate system and a movement vector of the user in a world rectangular coordinate system. In a specific implementation, the first movement vector may be obtained by subtracting the movement vector of the interactor in the world rectangular coordinate system from a movement vector of the head-mounted display worn by the user in the world rectangular coordinate system, but the present disclosure is not limited thereto.

Step S9-130: Determine a first projection vector obtained by projecting the first movement vector onto a plane where a target virtual object is located, and a second projection vector obtained by projecting the first movement vector onto a plane that a user is facing.

In some embodiments, the target virtual object is an object in the three-dimensional environment that the user intends to interact with (e.g., move, drag). In a specific implementation, an object that the user is gazing at may be determined as the target virtual object. For example, a cone projection may be performed based on tracking of eye movement and a posture of the user, and a target virtual object displayed in the virtual reality space may be determined based on the cone projection. Furthermore, the target virtual object may also be determined by other relevant eye tracking techniques, which is not limited in the present disclosure. In a specific implementation, an object to which a navigation ray is directed may be used as the target virtual object, where the navigation ray has its direction changed based on a pose of the interactor in a real space, such that the user can select the virtual object in the three-dimensional environment through the navigation ray by manipulating the interactor.

In some embodiments, the target virtual object includes a 2D application interface or a visual element in the 2D application interface. For example, the target virtual object may be an application interface, or may be a component, a control, or other visual elements allowing user interaction in the application interface.

The first projection vector is a vector obtained by projecting the first movement vector onto the plane where the target virtual object is located, and the second projection vector is a vector obtained by projecting the first movement vector onto the plane that the user is facing. The plane that the user is facing is a plane toward which the user is facing or is oriented. There is some actual application scenario in which the user does not face the target virtual object with which they are interacting (such as an application interface), which results in non-parallel between the plane that the user is facing and the plane where the target virtual object is located, and in this case, the first projection vector and the second projection vector have different directions and/or magnitudes.

In some embodiments, the plane that the user is facing may be determined based on a current pose of a head-mounted display worn by the user, or the plane that the user is facing may be determined based on line of sight of the user (for example, a plane perpendicular to the line of sight of the user).

In some embodiments, the plane that the user is facing is a plane whose normal vector is a vector formed by a position of the head of the user and a position of the plane where the target virtual object is located. In a specific implementation, the position of the plane where the target virtual object is located is represented by a point on the plane (such as the center point). In a specific implementation, the point representing the position of the plane where the target virtual object is located is on the plane that the user is facing, and thus the specific position of the plane that the user is facing may be determined, but the present disclosure is not limited thereto.

Step S9-140: Obtain a mixed vector based on the first projection vector and the second projection vector.

For example, assuming the first projection vector is a, and the second projection vector is b, the mixed vector c is calculated as follows:

$$c = \lambda a + \mu b$$

where $\lambda$ is a first weight coefficient corresponding to the first projection vector, and $\mu$ is a second weight coefficient corresponding to the second projection vector. If an included angle $\alpha$ between the first movement vector and the plane where the target virtual object is located is smaller relative to an included angle $\beta$ between the first movement vector and the plane that the user is facing (i.e., if an included angle between the first movement vector and a normal vector of the plane where the target virtual object is located is greater relative to an included angle between the first movement vector and the normal vector of the plane that the user is facing), the first weight coefficient $\lambda$ is greater relative to the second weight coefficient $\mu$; conversely, if the included angle $\alpha$ between the first movement vector and the plane where the target virtual object is located is greater relative to the included angle $\beta$ between the first movement vector and the plane that the user is facing (i.e., if the included angle between the first movement vector and the normal vector of the plane where the target virtual object is located is smaller relative to the included angle between the first movement vector and the normal vector of the plane that the user is facing), the first weight coefficient $\lambda$ is smaller relative to the second weight coefficient $\mu$. Thus, for a plane that has a relatively smaller included angle with the first movement vector, the calculated mixed vector is closer to the plane than the original first movement vector, (that is, having a smaller included angle with the plane); conversely, for a plane that has a relatively greater included angle with the first movement vector, the calculated mixed vector is further away from the plane than the original first movement vector, (that is, having a greater included angle with the plane).

In some embodiments, during calculation of an included angle between the first movement vector and a plane (e. g., the included angles $\alpha$ or $\beta$), an included angle between the first movement vector and its projection vector on the plane may be used, so that the included angle ranges from 0 to 90 degrees. In some embodiments, a sum of $\lambda$ and $\mu$ is always equal to a constant (e.g., 1).

Step 59-150: Update, in response to determining that a direction of the first movement vector meets a preset condition, a modulus of the mixed vector based on a modulus of the first movement vector, where an updated modulus of the mixed vector is approximately equal to the modulus of the first movement vector.

It should be noted that updating the modulus of the mixed vector does not change a direction of the mixed vector.

In some embodiments, if a ratio of the modulus of the mixed vector to the modulus of the first movement vector is within an interval of [0.9, 1.1], it can be considered that the moduli of the two are approximately equal.

Step S9-160: Determine a second movement vector on the plane where the target virtual object is located based on the mixed vector.

In some embodiments, based respectively on components of the mixed vector (a mixed vector with an updated modulus, if the modulus of the mixed vector is updated) corresponding to a first coordinate axis and a second coordinate axis in the world coordinate system, components of the second movement vector corresponding to a first coordinate axis and a second coordinate axis in a local coordinate system centered on the plane where the target virtual object is located may be obtained. A component of the second movement vector corresponding to a third coordinate axis in the local coordinate system is 0. The third coordinate axis is a coordinate axis perpendicular to the plane where the target virtual object is located. For example, if the mixed vector is represented as (x, y, z) in the world rectangular coordinate system, then coordinates of the second movement vector in the local rectangular coordinate system are (x, y, 0), where components z and 0 are components corresponding to the third coordinate axis (for example, z axis), the third coordinate axis corresponds to front and back directions in the rectangular coordinate system, and the third coordinate axis is a coordinate axis perpendicular to a plane, in a local coordinate system centered on the plane.

Step S9-170: Control the target virtual object based on the second movement vector.

The second movement vector is a vector obtained by projecting the mixed vector onto the plane where the target virtual object is located. In some embodiments, a display of the target virtual object may be moved or scrolled, based on the second movement vector. For example, if the target virtual object is a page that can be scrolled, the page may be scrolled based on the second movement vector (a position of the page itself remains the same, while a display of a content in the page is scrolled), which allows the user to scroll through a page in the three-dimensional environment by the interactor, to review related content. For another example, if the target virtual object is a movable visual element in the application interface, the visual element may be moved in the application interface based on the second movement vector.

According to one or more embodiments of the present disclosure, the mixed vector is obtained based on the first projection vector obtained by projecting the first movement vector of the interactor onto the plane where the target virtual object is located and the second projection vector obtained by projecting the first movement vector onto the plane that the user is facing. If the included angle between the first movement vector and the plane where the target virtual object is located is smaller relative to the included angle between the first movement vector and the plane that the user is facing, the weight of the first projection vector is greater relative to that of the second projection vector; and the target virtual object is controlled based on the second movement vector obtained by projecting the mixed vector on the plane where the target virtual object is located, so that it is possible to improve the situation where manipulation is gradually difficult as the included angle between the direction of movement of the interactor and the plane of the virtual object becomes larger, and to make the control of the target virtual object by the user more consistent with the perception of the user.

In some embodiments, the target virtual object is a component in the 2D application interface, and the method 9-100 further includes: determining a collision point of a navigation ray controlled by the user with a plane where the 2D application interface is located. The step S9-170 further includes the following steps:

Step A1: Determine local coordinates (i.e., first local coordinates) of an end position of the collision point in the local coordinate system centered on the 2D application interface, based on coordinates of a start position of the collision point and the second movement vector.

Step A2: Convert the first local coordinates of the end position of the collision point into local coordinates (i.e., second local coordinates) in an operating system corresponding to the 2D application interface.

Step A3: Send the second local coordinates to the operating system to cause the operating system to control the component based on the second local coordinates.

A native operating system to which the relevant 2D application interface is adapted (e.g. a mobile operating system that was originally intended for a touch screen smartphone) may not be able to access data (e.g. position data) about a specific component within an application. In this regard, according to one or more embodiments disclosed, the collision point of the navigation ray with the plane where the 2D application interface is located is used to replace the position of the 2D component in being a start position for an operation (such as a drag operation), and on this basis, the local coordinates of the collision point, after the operation, in the operating system corresponding to the 2D application, are obtained, and the local coordinates are injected to an operating system side, in order to generate a native Move event at the operating system side, so that the problem that a drag interaction with the relevant 2D application interface cannot be performed in the extended reality application scenario is solved, which improves the adaptability of the extended reality scene and the related 2D application interface.

In some embodiments, the preset condition includes the following: the direction of the first movement vector finally pointing to a spatial area formed by an included angle (usually an acute angle) between the plane where the target virtual object is located and the plane that the user is facing, or the included angle between the first movement vector and the plane where the target virtual object is located being not greater than the included angle between the plane where the target virtual object is located and the plane that the user is facing.

Figure 10:
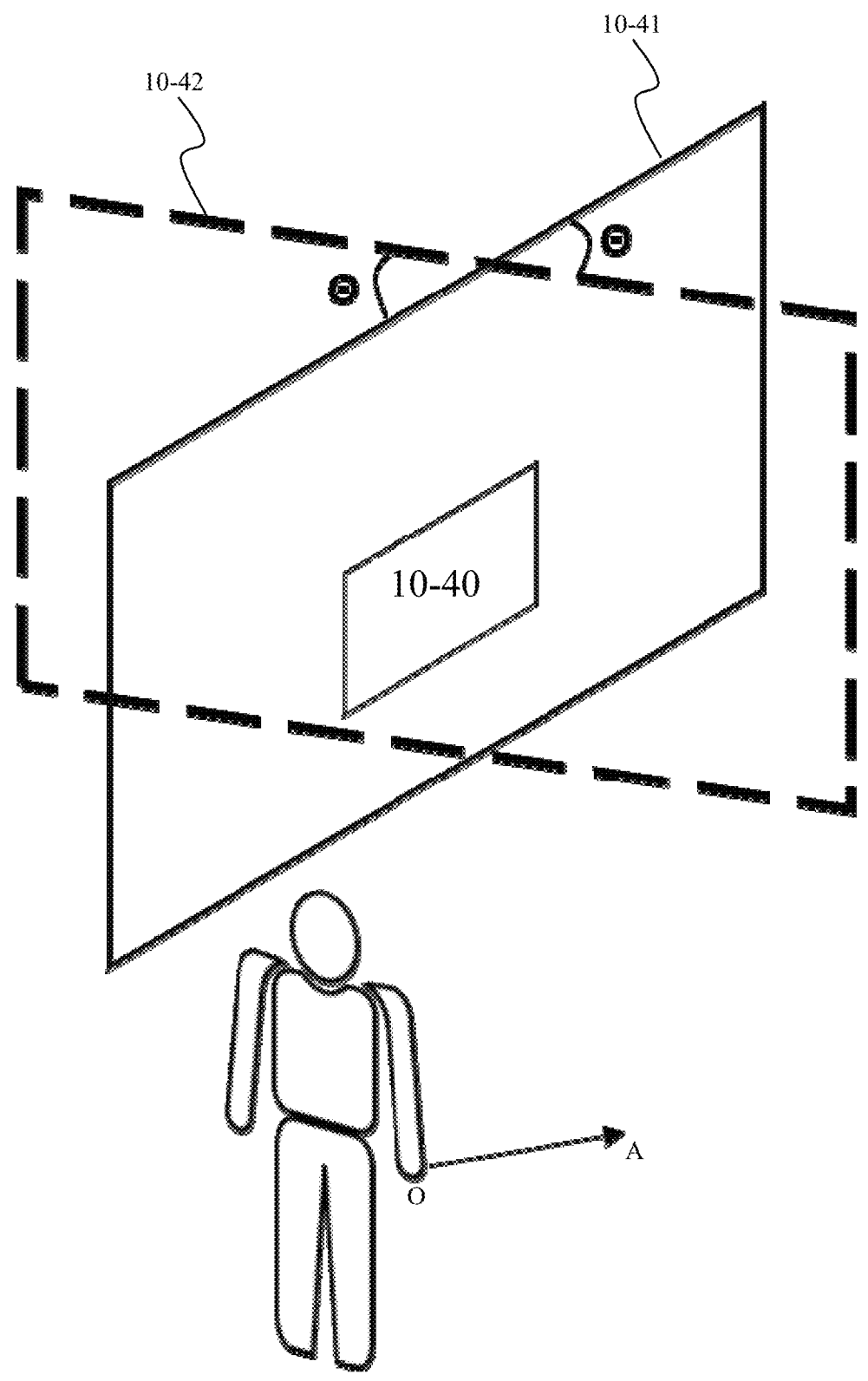
FIG. 10 is a schematic diagram of a plane where the target virtual object is located and a plane that a user is facing according to an embodiment of the present disclosure.

Referring to FIG. 10, a target virtual object 10-40 is located at a plane 10-41, and the user faces a plane 10-42, and the plane 10-41 and the plane 10-42 divide a space into four spatial areas, where a target spatial area is a spatial area formed by an included angle $\theta$ (usually an acute angle). If the direction of the first movement vector $\overrightarrow{OA}$ of the interactor finally points to the target spatial area defined by the included angle $\theta$, or if an included angle between the first movement vector $\overrightarrow{OA}$ of the interactor and the plane 10-41 is not greater than the included angle $\theta$, the modulus of the mixed vector is updated based on the modulus of the first movement vector. For example, the modulus of the mixed vector is approximately equal to the modulus of the first movement vector.

According to one or more embodiments of the present disclosure, on the one hand, when the direction of movement of the interactor meets the preset condition, the modulus of the mixed vector is updated based on the modulus of the first movement vector, and the modulus of the mixed vector is made to approximately equal to the modulus of the first movement vector, and the second movement vector is further obtained based on the components of the mixed vector on the first and second coordinate axes, so that when the direction of movement of the interactor meets the preset condition (for example, pointing to an angular area between the plane where the target virtual object is located and the plane that the user is facing), it is possible to further reduce difficulty of manipulation due to the larger included angle between the direction of movement of the interactor and the plane of the virtual object; on the other hand, when the direction of movement of the interactor does not meet the preset condition (for example, not pointing to the angular area between the plane where the target virtual object is located and the plane that the user is facing), by the aforementioned approach of calculating the mixed vector, a mapping ratio between the second movement vector and the first movement vector can decay from 1 to 0 at a faster rate, which is consistent to the perception of the user and reduces the range that is "difficult to manipulate", thus improving the user's manipulation efficiency and experience.

User interaction with a 2D application in the three-dimensional environment is illustrated below as an example. FIG. 11 is a flow diagram of a method for controlling a virtual object according to another embodiment of the present disclosure. Specifically, the following steps are performed at an electronic device in communication with a display generation component and an input device:

Step S11-201: Display, by the display generation component, a computer-generated three-dimensional environment.

Step 511-202: Determine a start position of a collision point of a navigation ray with a plane where the 2D application is located.

Step S11-203: Determine, based on position data of an interactor detected by an input device, a first movement vector of the interactor, where the first movement vector is a movement vector of the interactor relative to a user in a world coordinate system.

Step S11-204: Determine a first projection vector obtained by projecting the first movement vector onto a plane where the 2D application is located, and a second projection vector obtained by projecting the first movement vector onto a plane that a user is facing.

Step S11-205: Obtain a mixed vector based on the first projection vector and the second projection vector, where if an included angle between the first movement vector and the plane where the 2D application is located is smaller relative to an included angle between the first movement vector and the plane that the user is facing, a weight of the first projection vector is greater relative to that of the second projection vector.

Step S11-206: Determine whether a direction of the first movement vector meets a preset condition. For example, it may be determined whether the direction of the first movement vector finally points to a spatial area formed by the included angle between the plane where the 2D application is located and the plane that the user is facing; if the direction of the first movement vector finally points to the spatial area formed by the included angle between the plane where the 2D application is located and the plane facing the user, the steps S11-207 and S11-208 are performed; or if the direction of the first movement vector finally does not point to the spatial area formed by the included angle between the plane where the 2D application is located and the plane facing the user, the step S11-208 is performed.

Step S11-207: Update a modulus of the mixed vector based on the first movement vector, where the modulus of the mixed vector is approximately equal to a modulus of the first movement vector.

Step S11-208: Determine a second movement vector on the plane where the 2D application is located based on the mixed vector, where a vector (x, y, 0) is obtained based on components x, y of the mixed vector on X and Y axes, which is used as a second movement vector in a local coordinate system centered on the plane where the 2D application is located.

Step S11-209: Determine first local coordinates of an end position of a collision point in the local coordinate system, based on a start position of the collision point and the second movement vector.

Step S11-210: Convert the first local coordinates of the end position of the collision point into second local coordinates in an operating system corresponding to the 2D application.

Figure 12:
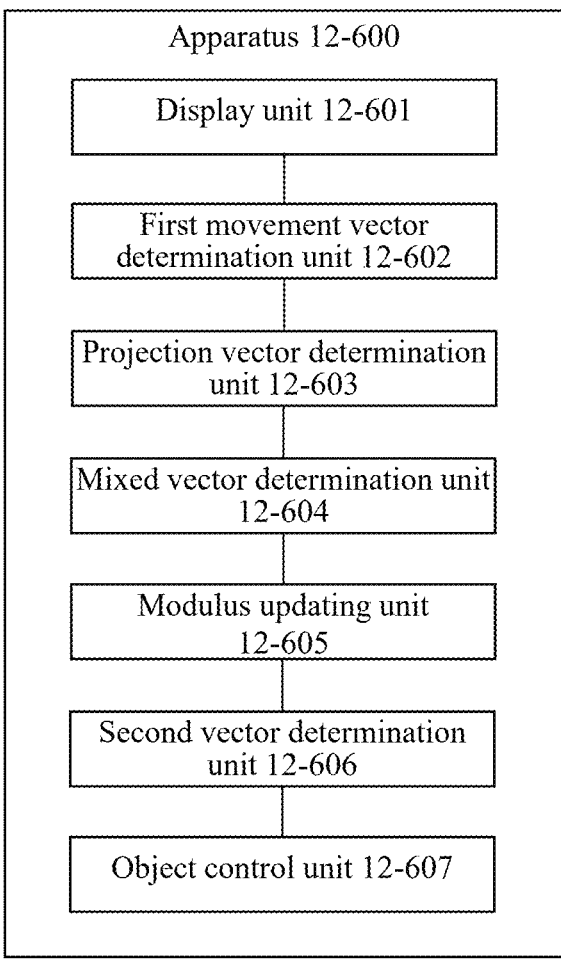
FIG. 12 is a schematic diagram of a structure of an apparatus for controlling a virtual object according to an embodiment of the present disclosure.

Accordingly, with reference to FIG. 12, according to an embodiment of the present disclosure, there is provided an apparatus 12-600 for controlling a virtual object. The apparatus includes: a display unit 12-601 configured to display a computer-generated three-dimensional environment; a first movement vector determination unit 12-602 configured to detect, by an input device, position data of an interactor and determine, by the input device and based on the position data, a first movement vector of the interactor; a projection vector determination unit 12-603 configured to determine a first projection vector obtained by projecting the first movement vector onto a plane where a target virtual object is located, and a second projection vector obtained by projecting the first movement vector onto a plane that a user is facing; a mixed vector determination unit 12-604 configured to obtain a mixed vector based on the first projection vector and second projection vector, where if an included angle between the first movement vector and the plane where the target virtual object is located is smaller relative to an included angle between the first movement vector and the plane that the user is facing, a weight of the first projection vector is greater relative to that of the second projection vector; a modulus updating unit 12-605 configured to update, in response to determining that a direction of the first movement vector meets a preset condition, a modulus of the mixed vector based on a modulus of the first movement vector, where an updated modulus of the mixed vector is approximately equal to the modulus of the first movement vector; a second vector determination unit 12-606 configured to determine a second movement vector on the plane where the target virtual object is located based on the mixed vector; and an object control unit 12-607 configured to control the target virtual object based on the second movement vector.

In some embodiments, the object control unit is configured to move or scroll a display of the target virtual object.

In some embodiments, the second vector determination unit is configured to obtain, based respectively on components of the mixed vector corresponding to a first coordinate axis and a second coordinate axis in a world coordinate system, components of the second movement vector corresponding to a first coordinate axis and a second coordinate axis in a local coordinate system centered on the plane where the target virtual object is located, wherein a component of the second movement vector corresponding to a third coordinate axis in the local coordinate system is 0, and the third coordinate axis is a coordinate axis perpendicular to the plane where the target virtual object is located.

In some embodiments, the preset condition includes the following: the direction of the first movement vector finally pointing to a spatial area formed by the included angle between the plane where the target virtual object is located and the plane that the user is facing; or the included angle between the first movement vector and the plane where the target virtual object is located being not greater than the included angle between the plane where the target virtual object is located and the plane that the user is facing.

In some embodiments, the target virtual object includes a 2D application interface or a visual element therein.

In some embodiments, the target virtual object is a component in the 2D application interface.

The apparatus further includes: a collision point determination unit configured to determine a collision point of a navigation ray controlled by the user with the plane where the target virtual object is located.

The object control unit includes: an end determination unit configured to determine an end position of the collision point based on a start position of the collision point and the second movement vector; a coordinate conversion unit configured to convert first local coordinates of the end position of the collision point in a local coordinate system centered on the 2D application interface into second local coordinates of the end position of the collision point in an operating system corresponding to the 2D application interface; and a coordinate sending unit configured to send the second local coordinates to the operating system to cause the operating system to control the component based on the second local coordinates.

In some embodiments, the first movement vector is a movement vector of the interactor relative to the user.

In some embodiments, the interactor includes an interaction control device or a body part of the user.

The apparatus embodiments are substantially corresponding to the method embodiments, and therefore reference of a related part, may be made to the descriptions of the part in the method embodiments. The apparatus embodiments described above are only illustrative, and the modules described as separate modules therein may or may not be separate. Some or all of the modules may be selected according to actual needs to achieve the objectives of the solutions of the embodiments, which can be understood and implemented by those of ordinary skill in the art without involving any inventive effort.

Accordingly, according to one or more embodiments of the present disclosure, there is provided an electronic device. The electronic device includes: at least one memory and at least one processor, where the memory is configured to store program code, and the processor is configured to call the program code stored in the memory, to cause the electronic device to perform the method for controlling a virtual object according to one or more embodiments of the present disclosure.

Accordingly, according to one or more embodiments of the present disclosure, there is provided a non-transitory computer storage medium storing program code that is executable by a computer device to cause the computer device to perform the method for controlling a virtual object according to one or more embodiments of the present disclosure.

Figure 13:
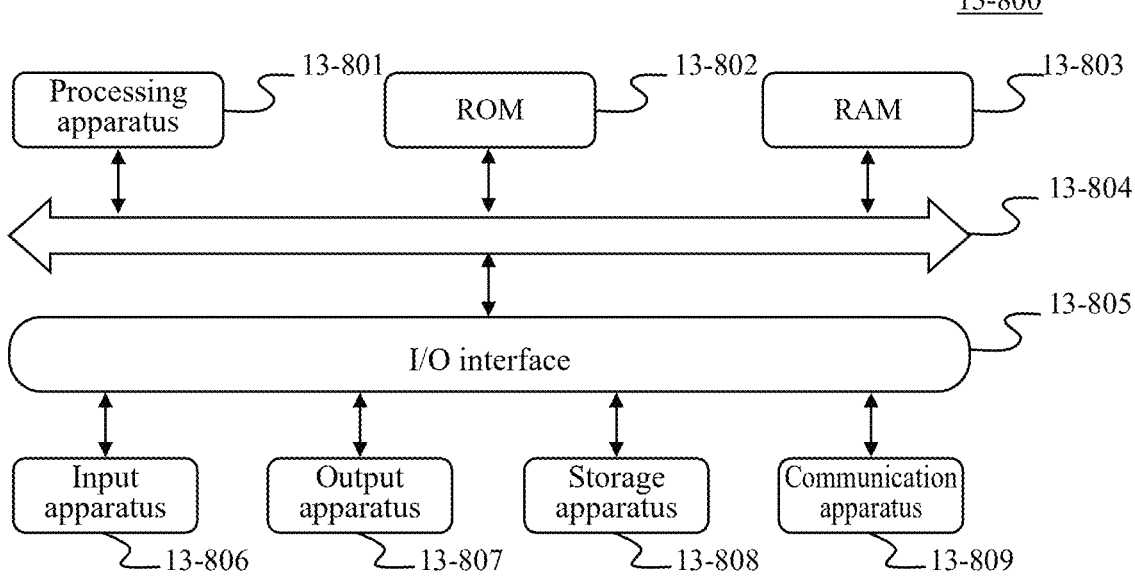
FIG. 13 is a schematic diagram of a structure of an electronic device according to an embodiment of the present disclosure.

Reference is made to FIG. 13 below, which is a schematic diagram of a structure of an electronic device 13-800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a PAD (tablet computer), a portable multimedia player (PMP), and a vehicle-mounted terminal (such as a vehicle navigation terminal). The electronic device shown in FIG. 13 is merely an example, and shall not impose any limitation on the function and scope of use of the embodiments of the present disclosure.

As shown in FIG. 13, the electronic device 13-800 may include a processing apparatus (e.g., a central processing unit or a graphics processing unit) 13-801 that may perform a variety of appropriate actions and processing in accordance with a program stored in a read-only memory (ROM) 13-802 or a program loaded from a storage apparatus 13-808 into a random access memory (RAM) 13-803. The RAM 13-803 further stores various programs and data required for operations of the electronic device 13-800. The processing apparatus 13-801, the ROM 13-802, and the RAM 13-803 are connected to each other through a bus 13-804. An input/output (I/O) interface 13-805 is also connected to the bus 13-804.

Generally, the following apparatuses may be connected to the I/O interface 13-805: an input apparatus 13-806 including, for example, a touchscreen, a touchpad, a keyboard, a mouse, a camera, a microphone, an accelerometer, and a gyroscope; an output apparatus 13-807 including, for example, a liquid crystal display (LCD), a speaker, and a vibrator; the storage apparatus 13-808 including, for example, a tape and a hard disk; and a communication apparatus 13-809. The communication apparatus 13-809 may allow the electronic device 13-800 to perform wireless or wired communication with other devices to exchange data. Although FIG. 13 shows the electronic device 13-800 having various apparatuses, it should be understood that it is not required to implement or have all of the apparatuses shown. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded from a network through the communication apparatus 13-809 and installed, installed from the storage apparatus 13-808, or installed from the ROM 13-802. When the computer program is executed by the processing apparatus 13-801, the above-mentioned functions defined in the method of the embodiment of the present disclosure are performed.

According to one or more embodiments of the present disclosure, there is provided a method for controlling a virtual object. The method includes: performing the following steps at an electronic device in communication with a display generation component and an input device: displaying, by the display generation component, a computer-generated three-dimensional environment; detecting, by the input device, position data of an interactor and determining, by the input device and based on the position data, a first movement vector of the interactor; determining a first projection vector obtained by projecting the first movement vector onto a plane where a target virtual object is located, and a second projection vector obtained by projecting the first movement vector onto a plane that a user is facing; obtaining a mixed vector based on the first projection vector and the second projection vector, where if an included angle between the first movement vector and the plane where the target virtual object is located is smaller relative to an included angle between the first movement vector and the plane that the user is facing, a weight of the first projection vector is greater relative to that of the second projection vector; updating, in response to determining that a direction of the first movement vector meets a preset condition, a modulus of the mixed vector based on a modulus of the first movement vector, where an updated modulus of the mixed vector is approximately equal to the modulus of the first movement vector; determining a second movement vector on the plane where the target virtual object is located based on the mixed vector; and controlling the target virtual object based on the second movement vector.

According to one or more embodiment of the present disclosure, controlling the target virtual object includes: moving or scrolling a display of the target virtual object.

According to one or more embodiments of the present disclosure, determining the second movement vector on the plane where the target virtual object is located based on the mixed vector includes: based respectively on components of the mixed vector corresponding to a first coordinate axis and a second coordinate axis in a world coordinate system, obtaining components of the second movement vector corresponding to a first coordinate axis and a second coordinate axis in a local coordinate system centered on the plane where the target virtual object is located, wherein a component of the second movement vector corresponding to a third coordinate axis in the local coordinate system is 0, and the third coordinate axis is a coordinate axis perpendicular to the plane where the target virtual object is located.

According to one or more embodiments of the present disclosure, the preset condition includes: the direction of the first movement vector finally pointing to a spatial area formed by the included angle between the plane where the target virtual object is located and the plane that the user is facing; or the included angle between the first movement vector and the plane where the target virtual object is located being not greater than the included angle between the plane where the target virtual object is located and the plane that the user is facing.

According to one or more embodiments of the present disclosure, the target virtual object includes a 2D application interface or a visual element therein.

According to one or more embodiments of the present disclosure, the target virtual object is a component in the 2D application interface. The method further includes: determining a collision point of a navigation ray controlled by the user with the plane where the target virtual object is located. And controlling the target virtual object based on the second movement vector includes: determining an end position of the collision point based on a start position of the collision point and the second movement vector; converting first local coordinates of the end position of the collision point in a local coordinate system centered on the 2D application interface into second local coordinates of the end position of the collision point in an operating system corresponding to the 2D application interface; and sending the second local coordinates to the operating system to cause the operating system to control the component based on the second local coordinates.

According to one or more embodiments of the present disclosure, the first movement vector is a movement vector of the interactor relative to the user.

According to one or more embodiments of the present disclosure, the interactor includes an interaction control device or a body part of the user.

According to one or more embodiments of the present disclosure, there is provided an apparatus for controlling a virtual object. The apparatus includes: a display unit configured to display a computer-generated three-dimensional environment; a first movement vector determination unit configured to detect, by an input device, position data of an interactor and determine, by the input device and based on the position data, a first movement vector of the interactor; a projection vector determination unit configured to determine a first projection vector obtained by projecting the first movement vector onto a plane where a target virtual object is located, and a second projection vector obtained by projecting the first movement vector onto a plane that a user is facing; a mixed vector determination unit configured to obtain a mixed vector based on the first projection vector and second projection vector, where if an included angle between the first movement vector and the plane where the target virtual object is located is smaller relative to an included angle between the first movement vector and the plane that the user is facing, a weight of the first projection vector is greater relative to that of the second projection vector; a modulus updating unit configured to update, in response to determining that a direction of the first movement vector meets a preset condition, a modulus of the mixed vector based on a modulus of the first movement vector, where an updated modulus of the mixed vector is approximately equal to the modulus of the first movement vector; a second vector determination unit configured to determine a second movement vector on the plane where the target virtual object is located based on the mixed vector; and an object control unit configured to control the target virtual object based on the second movement vector.

According to one or more embodiments of the present disclosure, there is provided an electronic device, including at least one memory and at least one processor, where the memory is configured to store program code, and the processor is configured to call the program code stored in the memory, to cause the electronic device to perform the method for controlling a virtual object according to one or more embodiments of the present disclosure.

According to one or more embodiments of the present disclosure, there is provided a non-transitory computer storage medium storing program code that is executable by a computer device to cause the computer device to perform the method for controlling a virtual object according to one or more embodiments of the present disclosure.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

I claim:

1. A method for moving a virtual object, comprising:
   displaying a computer-generated three-dimensional environment;
   determining a third movement vector of an interactor in a local spherical coordinate system with a user's own position as an origin;
   determining, based on the third movement vector, a fourth movement vector of a target virtual object in the three-dimensional environment in the local spherical coordinate system; and obtaining second coordinates of the target virtual object in the local spherical coordinate system based on first coordinates of the target virtual object currently in the local spherical coordinate system and the fourth movement vector.

2. The method according to claim 1, wherein the determining, based on the third movement vector, a fourth movement vector of a target virtual object in the three-dimensional environment in the local spherical coordinate system comprises:

determining the fourth movement vector based on the third movement vector and a distance between the user and the target virtual object in the three-dimensional environment.

3. The method according to claim 1, wherein the first movement vector is a movement vector of the interactor relative to the user.

4. The method according to claim 1, wherein the interactor comprises an interaction control device or a body part of the user.

5. The method according to claim 1, wherein the target virtual object comprises a three-dimensional object.

6. The method according to claim 1, further comprising: determining a virtual object in the three-dimensional environment at which the user is gazing as the target virtual object.

7. The method according to claim 1, further comprising:

detecting position data of the interactor and determining based on the position data, a first movement vector of the interactor in a world rectangular coordinate system; and determining, based on the first movement vector, a second movement vector of the interactor in a local rectangular coordinate system with the user's own position as an origin; and wherein the third movement vector of the interactor is determined based on the second movement vector.

8. The method according to claim 7, further comprising:

determining, based on the second coordinates, third coordinates of the target virtual object in the world rectangular coordinate system.

9. The method according to claim 8, further comprising: sending the second coordinates and/or the third coordinates to a requestor requesting a position of the target virtual object.

10. The method according to claim 8, further comprising:

recalculating, based on the third coordinates, coordinates of the target virtual object in the local rectangular coordinate system and/or the local spherical coordinate system.

11. An electronic device, in communication with a display generation component and an input device, the display generation component displaying a computer-generated three-dimensional environment, the input device detecting position data of an interactor and determining, based on the position data, a first movement vector of the interactor in a world rectangular coordinate system, the electronic device comprising:

at least one memory and at least one processor, wherein the memory is configured to store program code, and the processor is configured to call the program code stored in the memory to cause the electronic device to:

determine, based on the first movement vector, a second movement vector of the interactor in a local rectangular coordinate system with a user's own position as an origin;

determine, based on the second movement vector, a third movement vector of the interactor in a local spherical coordinate system with the user's own position as an origin;

determine, based on the third movement vector, a fourth movement vector of a target virtual object in the three-dimensional environment in the local spherical coordinate system; and obtain second coordinates of the target virtual object in the local spherical coordinate system based on first coordinates of the target virtual object currently in the local spherical coordinate system and the fourth movement vector.

12. The electronic device according to claim 11, wherein the processor is configured to call the program code stored in the memory to further cause the electronic device to:

determine, based on the second coordinates, third coordinates of the target virtual object in the world rectangular coordinate system.

13. The electronic device according to claim 12, wherein the processor is configured to call the program code stored in the memory to further cause the electronic device to:

send the second coordinates and/or the third coordinates to a requestor requesting a position of the target virtual object.

14. The electronic device according to claim 12, wherein the processor is configured to call the program code stored in the memory to further cause the electronic device to:

recalculate, based on the third coordinates, coordinates of the target virtual object in the local rectangular coordinate system and/or the local spherical coordinate system.

15. The electronic device according to claim 11, wherein the program code causing the electronic device to determine, based on the third movement vector, a fourth movement vector of a target virtual object in the three-dimensional environment in the local spherical coordinate system further causes the electronic device to:

determine the fourth movement vector based on the third movement vector and a distance between the user and the target virtual object in the three-dimensional environment.

16. The electronic device according to claim 11, wherein the first movement vector is a movement vector of the interactor relative to the user.

17. The electronic device according to claim 11, wherein the interactor comprises an interaction control device or a body part of the user.

18. The electronic device according to claim 11, wherein the processor is configured to call the program code stored in the memory to further cause the electronic device to: determine a virtual object in the three-dimensional environment at which the user is gazing as the target virtual object.

19. A non-transitory computer-readable storage medium at an electronic device in communication with a display generation component and an input device, the display generation component displaying a computer-generated three-dimensional environment, the input device detecting position data of an interactor and determining, based on the position data, a first movement vector of the interactor in a world rectangular coordinate system, the non-transitory computer storage medium storing program code that, when executed by a computer device, causes the computer device to:

determine, based on the first movement vector, a second movement vector of the interactor in a local rectangular coordinate system with a user's own position as an origin;

determine, based on the second movement vector, a third movement vector of the interactor in a local spherical coordinate system with the user's own position as an origin;

determine, based on the third movement vector, a fourth movement vector of a target virtual object in the three-dimensional environment in the local spherical coordinate system; and obtain second coordinates of the target virtual object in the local spherical coordinate system based on first coordinates of the target virtual object currently in the local spherical coordinate system and the fourth movement vector.

20. The non-transitory computer-readable storage medium according to claim 19, wherein the program code further causes the computer device to:

determine, based on the second coordinates, third coordinates of the target virtual object in the world rectangular coordinate system.

\* \* \* \* \*